(12) United States Patent
Kashani-Nejad et al.

(10) Patent No.: US 11,678,144 B2
(45) Date of Patent: Jun. 13, 2023

(54) REAL-TIME LOCATION AND ALERT SYSTEM

(71) Applicant: TraKid LLC, Cary, NC (US)

(72) Inventors: Arya Brandon Kashani-Nejad, Cary, NC (US); Steven S. Yauch, Cary, NC (US); Zachry A. Penix, Cary, NC (US); Robert A. McCraw, Cary, NC (US)

( * ) Notice: Subject to any disclaimer, the term of this patent is extended or adjusted under 35 U.S.C. 154(b) by 9 days.

(21) Appl. No.: 17/214,611

(22) Filed: Mar. 26, 2021

(65) Prior Publication Data

US 2021/0306807 A1    Sep. 30, 2021

Related U.S. Application Data

(60) Provisional application No. 63/000,808, filed on Mar. 27, 2020.

(51) Int. Cl.
*H04W 4/029*  (2018.01)
*G08B 7/06*  (2006.01)

(52) U.S. Cl.
CPC .............. *H04W 4/029* (2018.02); *G08B 7/06* (2013.01)

(58) Field of Classification Search
None
See application file for complete search history.

(56) References Cited

U.S. PATENT DOCUMENTS

| 11,043,086 | B1* | 6/2021 | Daoura | G08B 21/24 |
| 2018/0035257 | A1* | 2/2018 | McCormick | G06Q 20/3224 |
| 2021/0007325 | A1* | 1/2021 | Gill | A01K 11/008 |

\* cited by examiner

*Primary Examiner* — Adolf Dsouza
(74) *Attorney, Agent, or Firm* — John L. Sotomayor

(57) ABSTRACT

A device, method, and system for providing initial and on-going tracking and location information in real-time for individuals and items within a predetermined area. A plurality of tracking devices are connected to at least one remote server. The remote server provides geofencing and location of all tracking devices within a pre-configured physical area. The tracking devices provide real-time location updates to the at least one remote server including proximity information to established physical locations within the physical area. The tracking devices are also operable to provide transactional and personal information to the at least one remote server.

12 Claims, 16 Drawing Sheets

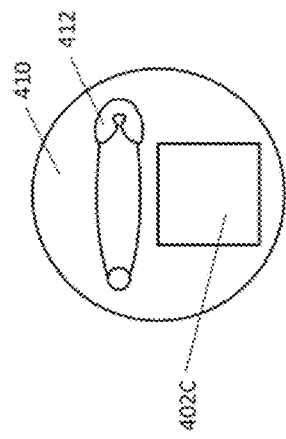
FIG. 3C
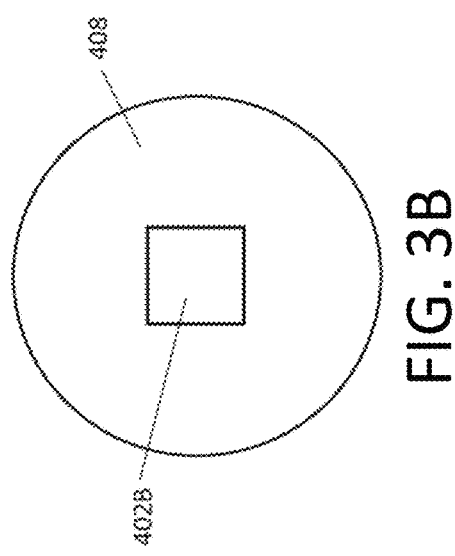
FIG. 3B
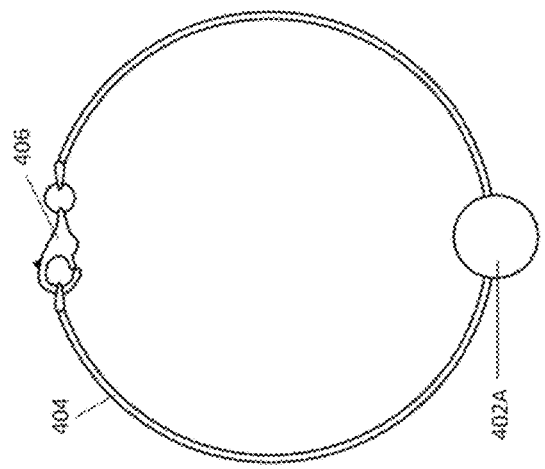
FIG. 3A
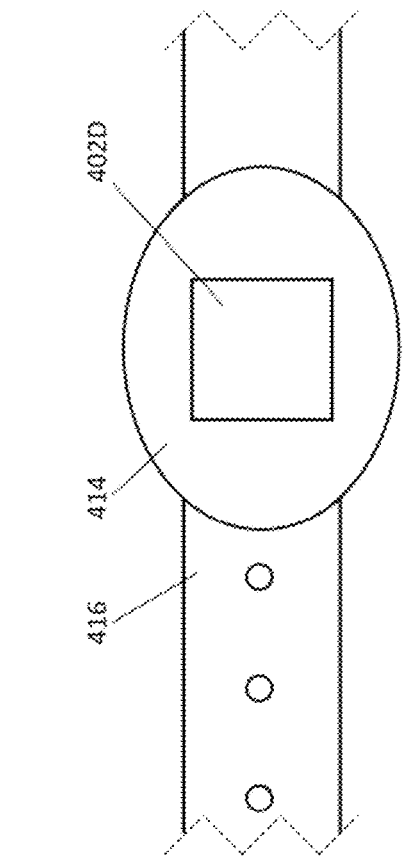
FIG. 3E
FIG. 3D

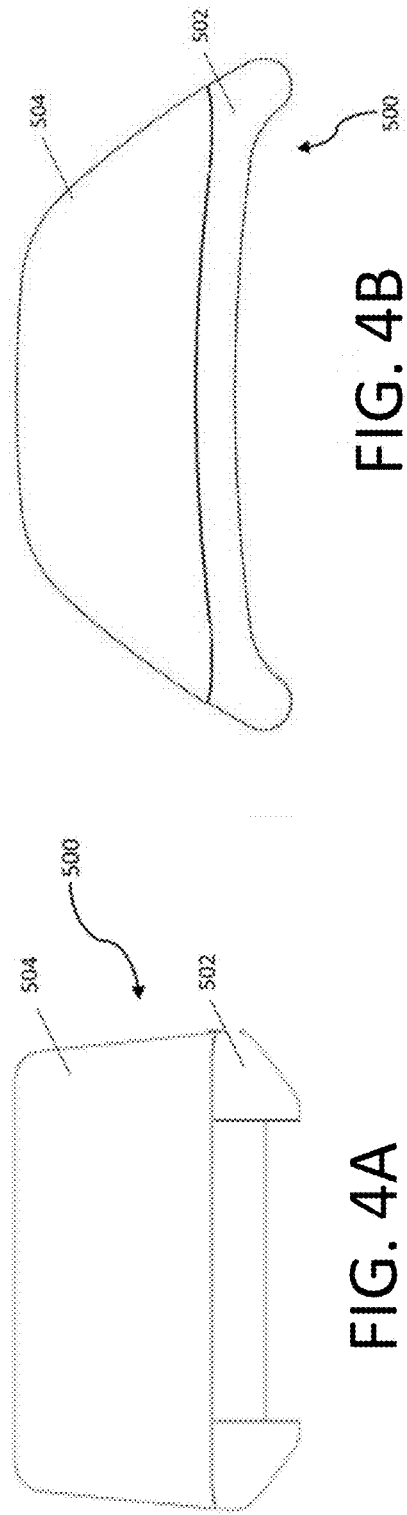
FIG. 4A
FIG. 4B
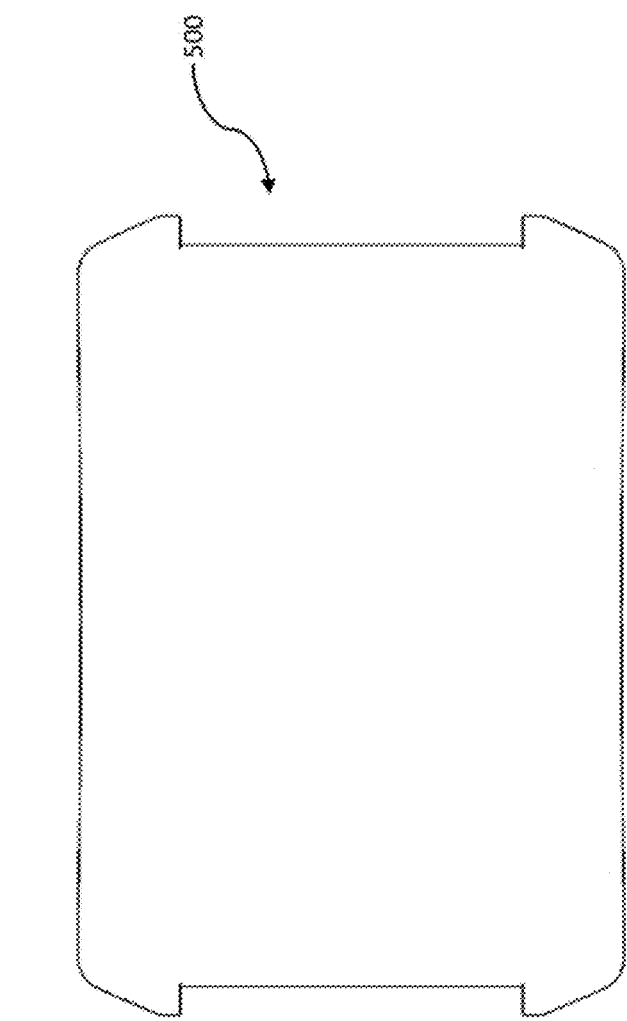
FIG. 4C

REAL-TIME LOCATION AND ALERT SYSTEM

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

CROSS-REFERENCE TO RELATED APPLICATION

This application claims the benefit of U.S. Provisional Application No. 63/000,808, filed Mar. 27, 2020, which is incorporated by reference herein in its entirety.

BACKGROUND

Losing children is not uncommon, with dozens of children getting lost in major amusement parks every day. Being lost in an unfamiliar place creates stress for both children and parents, which impacts the individual on both a physiological and psychological level, and leads them to be less likely to visit the park in the future. The same thing happens similarly in shopping centers, sporting venues, and other locations on a daily basis.

Additionally, assisted living facilities and hospitals must take great care to monitor the location of residents and patients, notably those who have dementia, in order to avoid residents and patients leaving areas they are supposed to be in. Whether leaving intentionally or not, these scenarios create similar stress for the individual, caretakers, and family members alike.

Individuals also often find themselves experiencing similar losses with items such as backpacks, communication devices, wallets, wheelchairs, and other commonly used items, whether it is due to leaving the item somewhere and forgetting it or the item being stolen. Therefore, it is important to manage the location of individuals and items to reduce the likelihood of stressful situations and financial loss.

Various methods of managing the location of individuals and items are known, including radio-frequency identification (RFID) tags and wristbands, proximity-based linked devices, and microchipping. These systems often include a physical device that is permanently placed. These systems are also operable to relay information to other devices within the system when touched or in very close proximity. embodiment of the present invention.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 3A is a front orthogonal view of a tracking device with certain embodiments of the present invention.

FIG. 3B is a front orthogonal view of a tracking device consistent with certain embodiments of the present invention.

FIG. 3C is a rear orthogonal of a tracking device consistent with certain embodiments of the present invention.

FIG. 3D is a front orthogonal view of a tracking device consistent with certain embodiments of the present invention.

FIG. 3E is a front orthogonal view of a tracking device consistent with certain embodiments of the present invention.

FIG. 4A is a front orthogonal view of a tracking device consistent with certain embodiments of the present invention.

FIG. 4B is a side orthogonal view of a tracking device consistent with certain embodiments of the present invention.

FIG. 4C is a top orthogonal view of a tracking device consistent with certain embodiments of the present invention.

DETAILED DESCRIPTION

Figure 1:
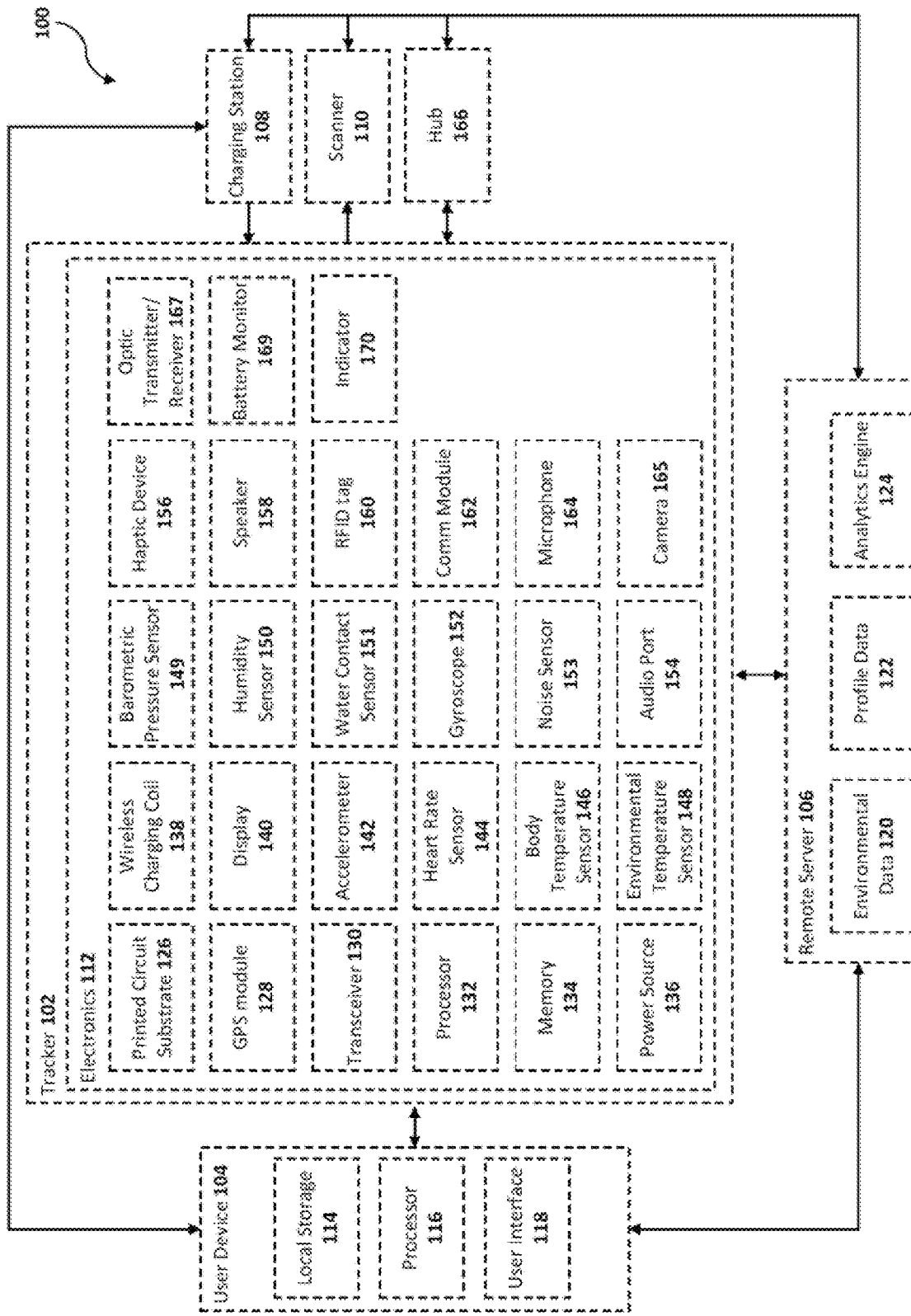
FIG. 1 is a block diagram of an embodiment of the real-time location and alert system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The present invention is generally directed to devices, methods, and systems for providing real-time location and alerts, and more specifically to devices, methods, and systems for providing real-time tracking of individuals and items within a predetermined area. Throughout the remainder of this document, a tracked individual or tracked item may be referred to as a tracked entity.

In a preferred embodiment, the user device is operable to store a user profile. In another preferred embodiment, the user device transmits the user profile to the remote server. The user profile may include, but is not limited to, a picture of the wearer or the object, a name associated with the wearer or the object (e.g., inventory number), and/or relevant medical information about a wearer that is provided voluntarily (e.g., child has autism, allergies, dementia). The user device may be operable to store information in the user profile for each wearer and/or object tracked by the user device and associated user devices. By way of example and not of limitation, the user profile on a first device of a first parent may include information for a first child, a second child, and an object that are shared with a second device of a second parent. The system is preferably operable to allow a plurality of user devices to be associated with a plurality of trackers. Advantageously, this allows large groups of individuals and/or objects to be tracked by multiple user devices. By way of example and not of limitation, if a school group including 30 children goes to a museum with 5 adults, each adult may have access to the tracking information of all 30 children. In some embodiments, the system may allow a tracker to be associated with a primary user device. By way of example and not of limitation, a group of 6 children may be primarily associated with the user device of each of the 5 adults.

As previously described, the user device may preferably operate a tracking application with a user interface, such as a graphical user interface, also known as a GUI. The GUI may be designed to be intuitive and to provide an efficient way for parents to track their children via trackers. The GUI may also be operable to be used by park staff to collect and analyze information about park visitors based on information sent by trackers and the user devices of parents and guardians.

In some embodiments, the GUI may be operable to be used by parents, guardians, and chaperones to track at least one child and/or at least one object via at least one tracker worn by the at least one child and/or attached to the at least one object. To begin tracking, the user may first download a mobile application on the user device, such as, in a non-limiting example, a mobile device associated with a user. In a preferred embodiment, the mobile device is a smartphone which is running GOOGLE LLC's ANDROID operating system or APPLE INC.'s IOS operating system.

In some embodiment, the GUI may present a prompt to add additional guardians. Additional guardians may include, but are not limited to, a second parent, a second guardian, additional adults at the venue (e.g., grandparents, aunts, uncles), chaperone, and/or teachers. The GUI may present a screen to add a guardian including a name and a phone number. The GUI may send a system notification to the added guardian via text message. The GUI may present a screen showing multiple guardians associated with at least one tracker.

The GUI may provide instructions which include demonstrating how to find a child on the map shown by the GUI, reporting a child as lost, and indicating that the parent will be contacted by park staff if the child is marked as lost. After one or more trackers have been connected to the user device, the trackers, representing the associated children, may be operable to be viewed on a map on the GUI. When a parent, guardian, or chaperone is not able to locate a child, the child may be selected on the map and may be reported as lost.

While reporting a lost child, a message may be automatically sent by one parent, guardian, or chaperone to any other connected parents, guardians, or chaperones to request assistance in locating the lost child. The user who marks a child as lost may also receive a message from park security that staff will assist in looking for the child.

The GUI may present a map of an amusement park with the real-time or near real-time location of a missing child. The map may show the location of the missing child, an option to report the missing child as found, and an option to share the missing child's location. In some embodiments, the missing child's location may be shared to security staff at the venue. In another embodiment, the missing child's location may be shared to all employees at the venue. In still another embodiment, the missing child's location may be shared to all system users within a designated radius (e.g., 1000 ft) of the missing child. In yet another embodiment, the missing child's location may be shared to all system users. The GUI may present an option to share the location of the missing child with nearby system users.

In some embodiments, park staff may request an up-to-date image of the missing child. The GUI may provide an option to report the missing child as found. When a lost child is reported as found, a system message may be sent to venue staff indicating that the missing child has been found.

The GUI may provide a settings screen. The settings screen may be operable to allow a user to edit the user profile and change location settings preferences. Additionally, frequently asked questions and information about the system may be provided. In some embodiments, the settings screen may include biometric preferences (e.g., FACE ID, TOUCH ID) to unlock the application using facial identification, fingerprint identification, or other biometric identification. Alternatively, the settings screen may include a preference to add a PIN. The system may preferably ask for confirmation of the PIN.

In some embodiments, the GUI may be operable to mark multiple children as lost and their locations may be marked relative to the park staff. The GUI may present demographic information for a lost child, such as, but not limited to, their name, location, special needs, and when they were reported lost, as well as a GUI option to contact the associated parent, guardian, or chaperone.

The tracker may also allow for the making of cashless purchases within a venue, such as within an amusement park, without the wearer needing to carry a credit card or other payment method. Quick, cashless payments reduce staffing needs, as fewer cashiers, if any, are required. In some embodiments of the invention, when signing up for or logging into an account via the GUI, the user may be prompted to enter payment information, such as a credit/debit information, and other related personal information. In some embodiments, a settings or profile screen on the GUI may provide a means for users to manage their payment information, see payments which have been completed, view completed activities (e.g., rides, shows), book accommodations, write reviews, and complete other relevant activities. Because each tracker has a unique code associated with it, when a scanner receives information from a tracker, the scanner may be operable to provide the remote server with the information on the tracker, which allows the remote server to identify the account and payment information associated with the tracker. This may allow the wearer to make contactless, easy payments with their tracker, such as for food and beverage, rides, photographs, interactive experiences, or other opportunities within the park. The remote server may also be operable to verify the privileges associated with the tracker including, but not limited to, access to a hotel room, access to a transportation system (e.g., a train between lodging and areas of a park or between one or more areas of a park), access to a particular activity, and access to age-restricted content such as attractions with graphic content.

In an alternative embodiment, users may add their payment information, such as a credit card or debit card, to their account at a connected charging station, at a designated kiosk when they obtain a tracker within a park which is also operable to be a park upgrade center, on a website such as the park's website, or through other electronic means including the user interface of a user device.

The tracker may provide a wearable experience for users. In some embodiments, the display may provide an interactive activity on the tracker itself. By way of example and not of limitation, the display may be touch sensitive and may include a game which a wearer plays while they are waiting in line for a ride or other park activity. In some embodiments, the games available to the user may be based on where they are in the park. In one example, a user may be waiting in line for a ride themed with a superhero, and the tracker may display a game based on the same superhero. Alternatively, the game may be displayed on consoles and/or touch screen displays located near the ride (e.g., in line). In some embodiments, all trackers may be connected to a unified gaming system that provides for wearers to share gameplay information with other users and place scores on leaderboards populated by scores from wearers in both the same park and other affiliated parks. In some embodiments, certain games and activities may be restricted to wearers of a tracker.

In another embodiment, the embodiment may include hubs which are located around the park, venue, or other location. By way of example and not of limitation, the hubs may be placed in strategic locations within the venue to alleviate patron's annoyance or discomfort of a long line for a specific attraction or ride. The hubs may be operable to include activities, games, information, or other materials to alleviate annoyance, discomfort, and/or boredom. The content of the hubs may be operable to be accessed using a tracker. In some embodiments, a wearer or user may interact with the hub via a scanner built into the hub. By way of example and not of limitation, the scanner may read a code on the display of the tracker. In another embodiment, the hub may utilize a communications interface (e.g., RFID, BLUETOOTH, wireless network such as WIFI, or other Near Field Communication (NFC) protocols), a physical plug connection, or another data transmission method to recognize the tracker. In another embodiment, the content of the hub is operable to be accessed by all patrons (i.e., including those without trackers) simply by interacting with it physically.

One non-limiting example of a game may be a compass-driven scavenger hunt. An explorer program may provide families the opportunity to go on child driven/parent assisted adventures throughout an outdoor venue such as a zoo, amusement park, water park, or other entertainment venue. These quests cast the child as the navigator and parent as the guide as they adventure around the venue together. Unique to the invention is a wearable IOT band that provides the child with a compass that provides unique auditory and visual alerts. During their day at the venue, the child may be drawn from point to point using the compass. Whether one or multiple children (per group/family) are on the adventure, all bands may point to the same location. Upon reaching the waypoint (an important place in the venue), the band may provide positive reinforcement to all members of the exploration party (group/family) and may then prompt the children to turn to their parents for specific entertaining, educational, or engaging content. The parents may have access to this hyper personalized, location-driven content through the companion mobile application that enables them to have an enriched experience together (parent/guardian and child) at that animal, roller coaster, or other interactive point in the venue. This experience is intentionally designed to reinforce the concept that "families that play together, stay together".

In some embodiments, the hub may include a safe location scanner, wherein a child or other tracker wearer may be operable to scan the tracker, or have the tracker otherwise detected, and have the parent or guardian automatically notified of the location of the child.

In some embodiments of the hub, games, activities, or other content available on the hub may be branded to a specific park and the specific park's rides or unique attractions. In another embodiment, the games, activities, or other content available on the hub may be branded to its location in a specific park, such as a superhero themed game operable to be played on a hub near to a superhero themed ride. In another embodiment, content on the hub may include specific marketing or promotional content, including promotional content from park partners. By way of example and not of limitation, the hub may provide a mechanism for a park to introduce new attractions, promote attractions which will be opening soon, teach patrons about park initiatives, advertise a new beverage, or advertise a restaurant, or provide any other relevant promotional content. The hub may also be operable to be used for general park information, such as, but not limited to, providing directions within the park, providing a directory, and providing real-time wait times for various attractions, as determined by trackers currently in line for those attractions. In some embodiments, certain promotions may be restricted to wearers of a tracker.

In yet another embodiment, a hub may also be operable to provide rewards to patrons. By way of example and not of limitation, by interacting with a hub via a tracker, the hub may provide a coupon to the patron. In another embodiment, wearers of trackers may be operable to earn rewards based on their interaction with the hubs, such as by playing games or filling out a survey or questionnaire. Rewards provided by the hubs may be in the form of points, real currency such as United States Dollars, a cryptocurrency, or another currency which is operable to be redeemed within the park or venue.

In another embodiment, the hub may also be operable to include a screen and display a map of a park or venue. In some embodiments, the map may be interactive. In another embodiment, the map may include real-time wait times for specific attractions, and/or attractions and merchandising promotions. In another embodiment, the screen may provide games, photos, videos, and other interactive experiences for park or venue guests. In yet another embodiment, the hub may further include a camera and/or microphone and may allow park or venue visitors to communicate electronically with park staff and security. In yet another embodiment, the hub may provide a means for individuals to find other members of a group which they are visiting the park or a group as a part of. At the hub, a user may be able to scan their tracker or user device, and a screen at the hub may be operable to display the location of other members of the user's group.

Combining real-time tracking with the payment application may provide any number of analytical opportunities to an amusement park or venue as well as retailers and advertisers. This system may tie purchase data to activity data for specific individuals, families, and groups as a whole. By way of example and not of limitation, the system may determine what sorts of purchases families make at LOAM or after riding a specific ride. Advantageously, these analytics may allow venues, retailers, and advertisers to market specific activities and goods to the consumer at specific times with a higher level of adoption. In another embodiment, by tying spending and activities to specific consumers, the consumers may be operable to receive rewards, such as, but not limited to, free hotel nights, free beverages, upgrades, and redeemable points. This information may also be operable to provide any other location or payment based behavioral analytics for visitors which a park or venue is interested in. In another embodiment, analysis may be performed and retail sales reports may be generated for each payment station, such as each refreshment vendor or souvenir store.

Similar to the making of payments, the tracker may also be operable to provide wearers with real-time wait times for rides. Conventional methods of determining the time for a ride or activity may include a park staff member waiting in and progressing through the line before reporting how long it took. Alternatively, a park staff member may hand a waiting visitor a card and reports how long the line took. Either method may provide a delayed understanding of the wait time, which may be substantially different for someone getting in the line when the park staff member or the waiting visitor reaches the front of the line. By gathering real-time data from the trackers, park management may be able to understand at any moment the rate at which people are moving through a line and relay that information to any interested party to know how long it will take to move through a line if they were to enter it immediately. Furthermore, the server may be operable to push real-time updates to nearby trackers and user devices to inform users that a nearby ride has a short or no wait time.

As non-limiting examples, the invention 100 may utilize one of the following line wait algorithms:

Virtual Barrier Lines Method
  Virtual barrier lines may be drawn on the entrance and exits for the ride queue. When the line segment drawn between two concurrent GPS location updates intersects the barrier lines, a user may be said to have entered or exited the line. When an enter event precedes an exit event, the delta time between the two events may be said to be that person's "wait time". Creating a weighted average of all completed traversals of the line over a predefined interval may then be viewed as the "wait time of the queue".

Zone Extrapolation Method
  The invention 100 may maintain a relational database containing GPS coordinates for all visitors (wearing a tracker or holding a mobile phone with a tracker application running in the foreground or background). As a non-limiting example, visitor positions may be updated every 15 seconds to 2 minutes. Each ride may be given a GPS boundary area which may be referred to as a ride area. For a given period, a weighted average of the time users spent in the zone minus the average amount of time that the ride takes to complete may be an estimate of time spent in the line before riding the ride.

The Engagement Measurement Method
  An engagement may begin when the tracker recognizes that it is within a predefined proximity of the indicated ride. This timestamp may be referred to as the "start" of the anticipated ride wait. While at the ride, the family may participate in a series of interactions through a companion mobile application. For those that press into the more difficult challenges, they may be required to "ride the ride" to discover a hidden element on the ride. Only by completing the ride are they able to answer a question about what hidden element was on the ride. That answer (provided through the mobile application) may be recorded to denote the "end" of the anticipated ride engagement time. To calculate the ride wait time for a single user, subtract the "start" time from the "end" time and then subtract the average ride time. The result of this calculation may be recorded in a relational database as an individual ride wait time. The average weight time may be calculated by taking a normal distribution of individual ride weight times over a given period and discarding outliers.

Geofencing is the creation of a virtual perimeter around a real-world geographic area, such as a home, a store, a portion of a park, or a neighborhood. The area of a geofence may be either dynamically generated, such as by a predetermined radius around a point (e.g., a radius of 100 meters), or may be made of a predetermined set of boundaries, such as a selection of city blocks on a map. Geofencing may use the signal from an electronic device to take an action or alert a user when they enter or exit the geofence. By way of example and not of limitation, a coupon or advertisement may be sent to a user's smart phone when they walk into a department store. Generally, geofencing may be operable to use the global positioning system (GPS), cellular data, radiofrequency, BLUETOOTH, or WI-FI to create boundaries and trigger the alert or action. Depending on the system used, geofencing may be operable to provide a more general or a hyper local location. By way of example and not of limitation, using GPS or cellular data may provide a location accuracy within a few hundred feet, telling park staff a user is within a certain area of the park (wide area) because GPS utilizes the relative positions of certain satellites to provide the location coordinates, but using BLUETOOTH and geofencing beacons provides a location accuracy within a few feet, telling park staff a user is near a specific attraction or where they are within a park shop (hyper local).

In some embodiments of the present invention, geofencing may be enabled for the tracker and the user device. The geofence may be defined within the context of an application run by the remote server and may be triggered by movement of the tracker into or out of a geofenced area. A park or other venue may be able to have multiple geofences of varying sizes. The geofence may also be defined in the code of the application providing the user interface on the user device, and may operate once a user has accepted location services, as previously described. A geofence may provide tremendous benefits in improving the safety of a park. When someone exits the park with a tracker or a tracker attached to park property such as a stroller or wheelchair, two notifications may be operable to be sent automatically. One notification may be sent to park staff to retrieve the property. Another notification may be sent to the user device to remind the user to return the property. By way of example and not of limitation, if a parent forgets to remove the tracker from the child, a notification may be sent to the user device to remind the parent to return the tracker or be charged for a replacement price of the tracker. In another embodiment, when a child exits a geofence of the park based on their tracker location, a similar alert may be sent to parents asking if they are with the child, and if not, park security is notified.

In another embodiment, in the GUI a parent, guardian, or chaperone may have the option to select that a child cannot or has trouble swimming. Additionally, the GUI may preferably be operable for the parent, guardian, or chaperone to select a height of the child. In some embodiments, the park may contain geofences around any water, such as water attractions, waterparks, pools, wave pools, and water rides, and when the child enters the geofence an alert may be sent to the user device and to park security in order to intercept the child. In some embodiments, a parent, guardian, or chaperone may elect to use this feature because the child or children they are responsible for cannot swim. In another embodiment, a parent, guardian, or chaperone may be operable to place a geofence around one or more rides or other attractions which they do not want the child or children they are responsible for to ride or participate in, and if the child or children approaches that ride or attraction, such as getting in a queue for it, the parent, guardian, chaperone, and/or park staff may be notified.

In yet another embodiment, the park may contain geofences around restricted areas such as, but not limited to, administrative areas and attractions under construction. When a user or a child, based on the user device or the tracker, respectively, enters the geofence of the restricted area, they may receive an alert to turn around and park security may be notified.

In an alternative embodiment, park staff may wish to restrict areas from where strollers, wheelchairs, or other wheeled objects are operable to be used. A geofence may be created for these areas. If a tracked stroller, wheelchair, or other wheeled object enters the area, an alert may be sent to the user device and park security in order to intercept the tracked stroller, wheelchair, or other wheeled object and the individuals with it, or in another embodiment wheels of the stroller, wheelchair, or other wheeled object may be automatically locked.

In another embodiment, all of the park and/or specific areas in the park may be geofenced. In the case of an emergency or major announcement, such as the kidnapping of a child or a fire, all of the devices within the geofenced area may receive a notification about the event and how to proceed safely.

In another embodiment of the present invention, the user device may be operable to allow a parent, guardian, and/or chaperone to set up a geofence to monitor the presence of one or more children. By way of example and not of limitation, the parent, guardian, and/or chaperone may set a radius-based geofence and may be alerted any time one or more associated children exceed that radius. Alternatively, the parent, guardian, and/or chaperone may set a geofence to the shape of a park they are in, such as a waterpark, and may be alerted any time one or more associated children exit that area of the park.

In another embodiment, geofences placed near shops, attractions, and rides provide targeted advertisement to nearby individuals, such as a sale at a shop, a family-friendly attraction, or a ride with a low wait time. In some embodiments, this only occurs if an individual has been identified as having an interest or possibly having an interest in receiving the notification based on past activity and spending habits. In another embodiment, users receive alerts based on options they have selected on the user interface, such as asking to be alerted when they come near a place to buy water or a thrill ride with a current wait of under 10 minutes. In some embodiments, user preferences regarding advertisements, rides, food, sales, and the like are stored in the settings of the mobile application.

In another embodiment, a geofence is created around an entire venue or parts of the venue. Data from all user devices with location access enabled is collected to the remote server and is operable to be used for greater park analytics and the crowdsourcing of content. By way of example and not of limitation, an amusement park is operable to collect all social media posts relating to the park, or a sporting venue is able to collect all social media posts regarding the home team.

Location data may be created in the present invention using one or more hardware and/or software components. By way of example and not limitation, location data may be created using the Global Positioning System (GPS), low energy BLUETOOTH based systems such as beacons, wireless networks such as WI-FI, Radio Frequency (RF) including RF Identification (RFID), Near Field Communication (NFC), magnetic positioning, and/or cellular triangulation. By way of example, location data may be determined via an Internet Protocol (IP) address of a device connected to a wireless network. A wireless router may also be operable to determine identities of devices connected to the wireless network through the router, and thus may be operable to determine the locations of these devices through their presence in the connection range of the wireless router.

In some embodiments of the present invention, one or more parents, guardians, and/or chaperones may also wear or carry a tracker. A user device may be used to connect a tracker worn or carried by one or more parents, guardians, and/or chaperones to a tracker worn by one or more children. In another embodiment, a scanner may be used to connect a tracker worn or carried by one or more parents, guardians, and/or chaperones to a tracker worn by one or more children. In an alternative embodiment, park staff may manually connect a tracker worn or carried by one or more parents, guardians, and/or chaperones to a tracker worn by one or more children. Linking the trackers worn by the parents, guardians, and/or chaperones and the trackers worn by children may provide benefits to the parents, guardians, and/or chaperones and to the park and park staff. In some embodiments, the parent, guardian, or chaperone tracker (hereafter the adult tracker) may be the same size as the child's tracker. In another embodiment, the adult tracker may have a longer band than the child tracker. In another embodiment, the adult tracker may have a larger chassis and a longer band than the child tracker.

In some embodiments of the present invention, when two connected trackers are more than a predetermined distance apart, each tracker may be operable to provide an alert. By way of example and not of limitation, each tracker may be operable to audibly beep via the speaker, vibrate via the haptic device, or display a notification on the display. Alternatively, the alert may be provided on the tracker worn by the parent, guardian, or chaperone. A default distance apart at which to trigger a notification may be about 100 feet. In an alternative embodiment, the default distance apart at which to trigger a notification may be between about 10 and about 500 feet. In another embodiment, an alert may not be sent if one or more of the trackers is moving rapidly and is within a geofenced area representing a ride, as this would cause unnecessary panic for a parent whose child was riding the ride and was not missing. In another embodiment, park staff may be automatically notified when the two or more associated bands exceed a predetermined distance apart for more than a predetermined time. By way of example and not of limitation, park staff may be automatically notified if the two or more associated bands are more than about 100 feet apart for more than about 10 minutes. In another embodiment, park staff may be automatically notified if the two or more associated bands are more than about 100 feet apart for more than between about 5 minutes and about 20 minutes. In yet another embodiment, park staff may be automatically notified if the two or more associated bands are more than about 100 feet apart for more than between about 2 minutes and about 60 minutes.

In another embodiment, the display may be touch-sensitive and a parent, guardian, and/or chaperone may be operable to use their tracker to control the tracker of an associated child. By way of example and not of limitation, if the parent, guardian, and/or chaperone does not know where the associated child is, the display may include a GUI that, when tapped, causes the speaker of the connected child's tracker to audibly beep or vibrate via the haptic device. In an alternative embodiment, the tracker of the parent, guardian, and/or chaperone may include a physical button which is pressed to create the same audible or haptic effect.

In an alternative embodiment, the trackers may include touch-sensitive displays. Parents, guardians, and/or chaperones may be operable to send messages back and forth by typing messages out on the displays. As previously described, in yet another embodiment, users may insert headphones into the audio port, which may allow for calls between connected trackers. In another embodiment, the tracker may include a microphone, and users may make calls between connected trackers by speaking into the microphone, wherein the returning sound is broadcast by the speaker. By way of example and not of limitation, with included microphone and speaker, the trackers may act as walkie talkies for a family or group. In yet another embodiment, the trackers may include a video camera and the connected trackers may be operable to be used to video chat.

Trackers associated with a parent, guardian, and/or chaperone may be operable to be used for many services within a park. The system may be operable to designate purchase price limits for particular trackers. By way of example and not of limitation, in some embodiments a parent, guardian, and/or chaperone tracker may be used to make purchases of more than a certain amount, while trackers associated with a child may be limited in the amount the child is able to spend. In another embodiment, a parent, guardian, and/or chaperone tracker may be used to purchase photos after a ride, rent a locker, open hotel room doors, make meal reservations, make transit reservations, adjust permissions for age-limited content accessible by child-associated trackers, or complete any other task typically reserved for adults. In some embodiments, certain activities may be restricted to wearers of a tracker and any other individuals connected to said tracker.

Placing trackers on adults in addition to children may create an opportunity for substantially more data to be collected and analyzed. By way of example and not of limitation, having additional trackers in use in an amusement park may assist in the creation of more accurate heat maps which illustrate how many people are in an area, and how densely they are clustered, in real time. Because having more people in an area may create a need for more staff, staffing may be able to be increased immediately, as opposed to only based on long term, difficult to collect trends. The tracker-based movement data may also help parks determine areas of higher and lower interest, areas more important to revenue such as rides that are more popular, and easily identify movement trends such as patrons tending to go to ride B after riding ride A. All of this information may be operable to be compared to other areas of the park, as well as between parks within an ownership group and across the industry as a whole, on an hourly, daily, weekly, monthly, seasonally, and yearly basis.

Tracking data may be gathered on the remote server and analyzed as a whole. Analyzed data may be visible on a GUI operated by park staff. The GUI may provide a park staff view showing average reunion time between parents, guardians, and chaperones and associated children, as well as the longest and shortest reunion times, over a predetermined date range.

In some embodiments, trackers may simply be set on or wrapped around one or more charging stations to charge wirelessly. In another embodiment, trackers may be secured to the charging stations by snapping on, by magnets, or by any other method operable to secure the trackers to the charging stations. In some embodiments, the power source of the tracker may be operable to be fully charged overnight. In another embodiment, the power source may be operable to be fully charged in under about eight hours.

In some embodiments, a charging station may be operable to charge numerous trackers at a time. The charging station may be shaped such that one or more the trackers are operable to be draped over the charging station such that the one or more the trackers will not move and such that the one or more the trackers do not need to be prepared in any way to be charged. The tracker may sit on a rest area of the charging station. One side of the strap of the charger may be operable to lay on the front of a charging station and the other side of the strap may be operable to hang in a slot. A bumper area may both prevent the tracker from falling into the slot and make sure that the tracker is sitting in the correct location of the rest area for wireless charging. In some embodiments, the charging station may be mounted on a wall or other vertical surface. In another embodiment, the charging station may be mounted or set on a counter or other horizontal surface. The charging station may be able to charge many trackers at once. In some embodiments, the charging station may be able to fit and charge about eight trackers at once. In another embodiment, charging station may be able to fit and charge between about four and about twelve trackers at once. In yet another embodiment, the charging station may be able to fit and charge up to about 1000 trackers at once.

The charging station may be modular and multiple charging stations may be able to be linked together to form a charging hub. A charging hub may allow for the charging of many more trackers in a common location. Multiple the charging stations may be able to be plugged into a base charging station. The base charging station may comprise a master control board, a fuse, a power switch, and indicators. The charging stations may be able to be plugged into the base charging station as needed, such as to maximize space availability or to meet the tracker capacity needs.

In some embodiments, the charging station may be controlled by a microprocessor in order to allow smart charging of multiple the trackers. The trackers may be placed on the charging station such that they charge overnight and are ready for use each day. When each of the trackers is placed on the charging station, the charging station may recognize that the tracker has been added and the charging station may also determine the current charge status of the tracker. In some embodiments, the charging station may determine the current charge status of the tracker from the battery monitor. In another embodiment, the optic transmitter/receiver may detect the placement of or removal of the tracker on the charging station and the tracker may transmit that information to the charging station. The control system of the charging station may then provide power to the trackers in an orderly fashion in order to optimize the number of the trackers that are able to be charged in the shortest amount of time. In another embodiment, the charging station may utilize a fast-charging algorithm to charge the trackers; however, this may only be utilized when necessary because it may decrease the life expectancy of the power source of the tracker.

Referring now to the drawings in general, the illustrations are for the purpose of describing one or more preferred embodiments of the invention and are not intended to limit the invention thereto.

FIG. 1 is a block diagram of one embodiment of the real-time location and alert system 100 (hereinafter invention). The invention 100 includes a tracker 102 with electronics 112, a user device 104, a remote server 106, and a charging station 108. In another embodiment, the invention 100 may also include a scanner 110 and/or a hub 166.

In a preferred embodiment, the tracker 102 includes a band, at least one attachment mechanism, a chassis, a release mechanism, and the electronics 112. In some embodiments, the tracker 102 may be worn by an individual on the wrist in the manner of a wristwatch. Alternatively, the tracker 102 may be worn by an individual around the neck in the manner of a necklace or around the ankle in the manner of an anklet. In another embodiment, the tracker 102 may be attached to other items, such as, but not limited to, a wheelchair, a walker, a stroller, a backpack, a purse, a sports implement, or other object of value and associated with an individual. By way of example and not of limitation, the tracker 102 includes a latching mechanism installed in place of a band and which is operable to latch onto common geometric elements or features of a stroller. The latching mechanism may be operable to include a rigid body, flexible rubber, and/or a strap-like material operable to secure the tracker 102 to a movable object. In yet another embodiment, the tracker 102 may be a patch or a sticker that is attachable to skin and/or objects. In yet another embodiment, the tracker 102 may be attached to livestock, such as a cow, through the ear of the animal or around the neck of the animal. The electronics 112 of the tracker 102 preferably connect the tracker 102 to various networks, including, but not limited to, cellular networks and the global positioning system, in such a way that the remote server 106 is operable to locate the tracker 102 at all times. In a non-limiting example, the tracker 102 may be operable to be used to track individuals and items at locations and events such as, but not limited to, amusement parks, sporting events, ski and snowboard resorts, mountain bike parks, schools, school-related events such as field trips, festivals, fairs, circuses, farms, campuses, and other locations and events where individuals and items may be lost by individuals visiting such locations or events.

The electronics 112 preferably include any of a printed circuit board 126, a GPS module 128, a transceiver 130, at least one processor 132, a system memory 134, a wireless charging coil 138, a display 140, an accelerometer 142, a heart rate sensor 144, a body temperature sensor 146, an environmental temperature sensor 148, a barometric pressure sensor 149, a humidity sensor 150, a water contact sensor 151, a gyroscope 152, a noise sensor 153, an audio port 154, a haptic device 156, a speaker 158, an RFID tag 160, a communications module 162, a microphone 164, a camera 165, an optic transmitter/receiver 167, a battery monitor 169, an indicator 170, or combinations thereof.

In some embodiments, the electronics 112 may further include the system memory 134 which is operable to include a random-access memory (RAM) and a read only memory (ROM), as well as a system bus that couples the at least one memory to the at least one processor 132. In another embodiment, the electronics 112 may additionally include components such as a storage device for storing an operating system. Storage devices and the system memory 134 include, but are not limited to, volatile and nonvolatile media such as cache, RAM, ROM, EPROM, EEPROM, FLASH memory, or other solid state memory technology; discs or other optical storage; magnetic storage devices; or any other medium that is operable to be used to store the computer readable instructions and which is able to be accessed electronically.

The electronics 112 further include a power source 136. In a preferred embodiment, the power source 136 is a rechargeable battery. Alternatively, the power source may be a replaceable battery (i.e., single use battery). The power source 136 may be used to power the tracker 102. In some embodiments, the power source may be located on the printed circuit board 126. Alternatively, the power source 136 may be located within a chassis on the tracker and not on the printed circuit board 126. In some embodiments, if the power source falls below a predetermined charge level, the tracker 102 may be operable to indicate that it needs to be exchanged for another tracker which is charged. By way of example and not of limitation, the tracker 102 may display a battery warning on the display 140. Alternatively, the user device 104 may display a notification about low battery power after the tracker 102 transmits a message to the user device 104. The electronics 112 may be further operable to include the battery monitor 169 to relay real-time charge level information about the tracker 102 to the user device 104 and the remote server 106.

In an embodiment where the power source 136 is a rechargeable battery, the electronics 112 may be operable to include the wireless charging coil 138 (e.g., a fast-charging QI wireless charging coil), which allows the power source 136 to be easily charged overnight. By way of example and not of limitation, an amusement park may utilize a plurality of the charging stations 108, wherein a plurality of the trackers 102 are operable to be charged simultaneously, simplifying steps for park employees as they do not need to take the time to plug in each of the trackers 102. Alternatively, the electronics 112 may not contain a wireless charging coil and instead may be plugged in directly to a power source via a cable, such as a micro-USB cable, 30-pin connector, or other cable known in the art.

In some embodiments, the electronics 112 may include the display 140. The display 140 may be operable to be mounted on the printed circuit board 126 such that the display 140 is exposed from the top of the chassis. The display 140 may be operable to provide environmental data, sensor data, location, alerts, time and/or date, pictures, designs, branding, promotions, a video feed, maps, and other relevant information to the wearer of the tracker 102. In some embodiments, the display may be about one inch wide by about one inch long. In alternative embodiments, the display may be about two inches wide by about two inches long. In yet other embodiments, the display may be between about 0.25 and about 3 inches wide, and between about 0.25 inches and about 3 inches long. In other embodiments, the length and/or width of the display may be greater than about three inches in size. In some embodiments, the display 140 may be used to provide interactive activities within an area, or may be operable to display a code which is able to be scanned at various locations within an area, providing for an interactive experience or gamification. In some embodiments, the display 140 may be a touch-sensitive display. In some embodiments, the display 140 may include a keypad, buttons, a keypad and buttons, or another means of physically entering commands. In other embodiments, the display 140 may include a graphical user interface (GUI). In some embodiments, the GUI may be used to provide wearers of the device the ability to communicate with park staff, parents, guardians, and other individuals directly through the display, in particular, other users connected to that wearer's account. As a non-limiting example, this communication may include short message service (SMS) and other standard text messaging services. In some embodiments, the display 140 may be operable to display other information which may be relevant to the wearer including, but not limited to, a map, coordinates, games, charge level, a compass, directions to a specific ride or location, environmental information such as temperature, pressure, and humidity, real-time acceleration and G-forces, real-time speed, steps or distance traveled, and/or the location of connected devices such as the user device 104 of a parent, guardian, or chaperone.

The electronics 112 may contain a plurality of sensors and data collection devices. These may include, but are not limited to, the accelerometer 142, the heart rate sensor 144, the body temperature sensor 146, the environmental temperature sensor 148, the barometric pressure sensor 149, the humidity sensor 150, the water contact sensor 151, and the gyroscope 152. The accelerometer 142 and the gyroscope 152 may be operable to provide data about the motion of the tracker 102 and the object or person to which it is attached, such as if the wearer has fallen, is suddenly yanked, or otherwise changes position, as well as data regarding G-forces experienced such as on a ride. The heart rate sensor 144 may be incorporated into embodiments of the tracker where it is able to contact the skin of a wearer, such as a wristband, necklace, or anklet. The heart rate may be determined using electrocardiography, pulse oximetry, ballistocardiography, or seismocardiography. In some embodiments, the heart rate sensor 144 may measure heart rate variability (HRV). HRV is a measurement of the variation in time intervals between heartbeats. A high HRV measurement may be indicative of less stress, while a low HRV measurement may be indicative of more stress, which is often indicative of a wearer being in a dangerous situation. In some embodiments, the heart rate sensor 144 may monitor heart health indicators over a period of time, such as over the course of a day, and may be operable to provide alerts when the wearer's heart rate falls below a predetermined rate or climbs above a predetermined rate, including for a predetermined period of time. In some embodiments, the heart rate sensor 144 may be used to detect that the tracker 102 has been removed. By way of example and not of limitation, the heart rate sensor 144 may detect that the tracker 102 has been removed when no heart rate is able to be detected for a predetermined period of time. Responsive to such a determination, the tracker 102 may alert park authorities that the tracker 102 is no longer being worn.

The body temperature sensor 146 may measure the body temperature of a wearer. Body temperature may provide health information of the wearer (e.g., is wearer overheated) and advantageously is an additional way to determine that a wearer has not removed the tracker. The environmental temperature sensor 148, the barometric pressure sensor 149, the humidity sensor 150, and the water contact sensor 151 provide further environmental indicative of safety issues. In an alternative embodiment, temperature and humidity information may be used for targeted marketing, such as determining that a wearer is overheated (e.g., body temperature), likely to be hot (e.g., environmental temperature), or likely to be dehydrated and directing them to a location to buy water or other refreshments. In an alternative embodiment, the temperature and humidity information, as well as the heart rate sensor 144, may be used to notify park medical staff that a patron is having medical issues, such as overheating or dehydration. In another embodiment, water contact information may be used to notify park officials if a child has fallen in water and needs assistance.

The electronics 112 may comprise one or more the noise sensors 153 and/or one or more the audio ports 154. In some embodiments, the noise sensor 153 may be a microphone. A noise sensor may be operable to collect sounds from the environment nearby the tracker 102 and relay them to the user device 104, allowing the wearer of the tracker 102 to contact another individual, such as in a time of distress. The noise sensor 153 may also be operable to collect sounds from the environment nearby the tracker 102 and relay them to the remote server 106, wherein the sounds may be analyzed and acted upon, such as determining that a wearer is in distress or determining that a wearer is thirsty, and then providing targeted advertisements for the purchase of refreshments. The audio port 154 may allow wearers to plug headphones or other listening devices into the tracker 102 in order to receive audio information. By way of example and not of limitation, in some embodiments the tracker 102 may provide wearers with an audio tour of a location (e.g., park, museum) or may provide navigation to individuals who are visually impaired.

The electronics 112 may further include the haptic device 156. In some embodiments, the haptic device 156 may be incorporated into the tracker 102 within the chassis such that it provides a physical alert to a wearer. As a non-limiting example, the haptic device 156 may be a vibrator device or a piezo-electric device. In some embodiments, vibration may be produced by the haptic device 156 within the chassis such that it is non-audible and undetectable to nearby persons. In some embodiments, the haptic device may be audible and detectible to nearby persons. As a non-limiting example, when a parent marks a child as lost via the user device 104, the haptic device 156 may begin vibrating to alert the child that someone is actively looking for them.

The electronics 112 may further include the speaker 158 which is operable to provide auditory cues to assist in locating the tracker 102 and the individual or item carrying the tracker 102. By way of example, if a parent loses sight of a child in a crowded environment, the parent may be able to use the user device 104 to activate the speaker 158 in the tracker 102 to beep, assisting in finding the child. In some embodiments, the speaker 158 may be loud enough that it is able to be heard by individuals within about 20 feet of the tracker. In some embodiments, the speaker 158 may be operable produce sound loud enough that it is able to be heard by individuals within about 50 feet of the tracker. In some embodiments, the speaker 158 may be loud enough that it is able to be heard by individuals within a reasonable distance from the tracker in order to adequately alert the wearer's caregivers to the wearer's situation. In another example, if a child is abducted, the speaker 158 may be activated as an alarm in order to provide a cue to nearby persons that the child is in distress. Once activated, the alarm may be operable to be turned off only by the connected parent or guardian, authorized staff (e.g., park officials, security), and public safety officials (e.g., police officers) who are connected to the system. The speaker 158 may also be operable to be used for communication between the user or wearer of the tracker 102 and one or more other individuals, such as between a parent and a child.

The electronics 112 may further include the RFID tag 160. RFID stands for radio-frequency identification. The RFID tag 160 may include an inventory number of the tracker that is operable to identify the tracker. In some embodiments, the RFID tag 160 may be an active RFID tag. Alternatively, the RFID tag 160 may be a passive RFID tag. In a preferred embodiment, the RFID tag 160 may include on-chip cryptography.

The communications module 162 may allow the tracker 102 to communicate wirelessly with other devices (e.g., user device) via the transceiver 130. The wireless communication is, by way of example and not limitation, cellular, radiofrequency, BLUETOOTH, ZIGBEE, WI-FI, wireless local area networking, near field communication (NFC), infrared, other similar commercially utilized standards, or combinations thereof. In some embodiments, the communications module 162 may include a subscriber identification module (SIM) card, which is used to identify and authenticate subscribers for mobile telephony devices and store related information. The presence of the SIM card may allow the tracker 102 to communicate information regarding its location and status over a mobile network including by SMS. In a preferred embodiment, the SIM card is an Embedded-SIM (eSIM) card or a Nano-SIM card. In some embodiments, the SIM card may be a Micro-SIM card, a Mini-SIM card, or a Full-size SIM card. The tracker 102 may further utilize a cellular provider's internet of things (IoT) infrastructure to deliver status updates and location information about the tracker 102 to a NoSQL Database, which is a non-relational persistent store for information, which is accessible on other devices.

In another embodiment, the tracker 102 may include the microphone 164. In some embodiments, a first tracker may be operable to communicate directly with a second tracker by speaking into the microphone 164 on the first tracker, and the resulting sound may be broadcast by the speaker 158 on the second tracker. With the included microphone 164 and the speaker 158, the trackers 102 may act as walkie talkies for a family or group. In some embodiments, the tracker 102 may include a camera. In some embodiments, a first tracker may be operable to communicate directly with another tracker or the user device 104 by way of video using the camera 165 on the first tracker. The resulting video may be viewed by the display 140 on the second tracker or on the user device 104.

In some embodiments, the tracker 102 may include the optic transmitter/receiver 167. The optic transmitter/receiver 167 may be operable to emit a signal which reflects off the wrist of the wearer and back through the tracker 102 onto the optic transmitter/receiver 167. When the tracker 102 is removed from the wrist of the wearer, the signal may not return to the optic transmitter/receiver 167, and the tracker may be operable to indicate that it has been unattached and removed from the wearer.

The electronics 112 may further comprise a visual indicator 170. In some embodiments, the visual indicator 170 may be one or more lights. As a non-limiting example, the indicator 170 may be one or more LEDs. In some embodiments, the indicator 170 may be incorporated into the tracker 102 within the chassis such that it provides a visual alert to a wearer. In some embodiments, the indicator 170 may be a light, such as a green or red light, that is visible to nearby persons and acts as an indicator for whether a wearer is safe or lost. By way of example and not of limitation, if a wearer has not been marked as lost, the indicator 170 emits a green light, and when a parent, guardian, or chaperone marks a wearer as lost, the indicator 170 emits a bright red light to alert nearby persons and the wearer that someone is actively looking for the wearer.

The user device 104 may comprise local storage 114 and a processor 116. As non-limiting examples, the user device 104 may be a smart phone, smart watch, laptop computer, tablet computer, desktop computer, or any other device commonly known to be able to connect to the internet and utilize internet-based applications. The user device 104 may be operable to connect directly to the tracker 102 and to the remote server 106 in order to register the tracker 102 with the remote server 106 as well as send and receive relevant information. Furthermore, the user device 104 is preferably operable to utilize a tracking application with a user interface 118 (e.g., graphical user interface (GUI)).

The remote server 106 may be a source of environmental data 120 (e.g., maps, weather, building floorplans, etc.), profile data 122 (i.e., information on the tracker and the individual or the object the tracker is tracking), and an analytics engine 124. The remote server 106 may be operable to connect to, receive data from, and send data to any number of tracker devices 102. It is possible to have any number of remote servers greater than or equal to one.

In a preferred embodiment, the system may comprise the charging station 108 operable to recharge a rechargeable battery in the tracker 102. The hub 166 may be operable to identify the tracker 102 (e.g., via barcode, RFID) and receive information from the tracker 102 (e.g., location, payment information, reservation information) as well as trigger specific events on the tracker 102 and display location specific content.

The system may comprise the scanner 110. The scanner 110 may be operable to provide real-time location and alerts. The scanner 110 may be adapted to permit wearers and users to interact with the location tracking system as a whole. As non-limiting examples, the scanner 110 may be used to identify the tracker 102 (e.g., via barcode, RFID, or other identification technologies), to receive information from the tracker 102 (e.g., location, payment information, reservation information), and to equate collected information with specific users in the invention 100. By way of example and not of limitation, the scanner 110 may be operable to receive information from the tracker 102 including location, payment information, reservation information, emergency contact information, demographic information (e.g., age), and medical information (e.g., specific allergies). In another embodiment, the scanner 110 may be connected to other devices, such as door locks and gate locks, allowing the wearer to open or unlock devices using the tracker 102, as it is operable to transmit wearer-specific information. The scanner 110 may be operable to receive information from the tracker 102 by methods which include, but are not limited to, a barcode (e.g., Quick Response (QR) code), RFID, BLUETOOTH, and a physical electrical connection.

The invention 100 may include at least one tracker 102, at least one user device 104, at least one remote server 106, and at least one of the charging stations 108. In another embodiment, the invention 100 may also include at least one scanner 110 and/or at least one hub 166. All elements of the invention 100 send information between each other in order to maintain information regarding all of the trackers 102 in the system. This includes the data paths illustrated in FIG. 1 which include, but are not limited to, to and from the tracker 102 and the user device 104, to and from the tracker 102 and the remote server 106, from the tracker 102 to the scanner 110, to and from the user device 104 and the remote server 106, to and from the user device 104 and the charging station 108, to and from the remote server 106 and the charging station 108, to and from the remote server 106 and the scanner 110, from the charging station 108 to the tracker 102, to and from the tracker 102 and the hub 166, and to and from the remote server 106 and the hub 166. The communication between the elements of the invention 100 is preferably in real time or in near-real time.

The user device 104 may be operable to display the location of the tracker 102 (e.g., location of a child on a map of an amusement park) based on location signals sent from the tracker 102. The user device may also be operable to send a request to the tracker 102 to play a sound on the speaker 158, to activate the haptic device 156, and place specific information on the display 140. In some embodiments, the tracker 102 and the user device 104 may be operable to relay audio information, allowing two individuals to communicate in the case of emergency and/or as desired.

The tracker 102 may also send location information directly to the remote server 106. The remote server 106 may be operable to process and analyze this information. This includes, but is not limited to, monitoring the location of the tracker 102 in real-time or near real-time, analyzing time spent in a plurality of locations (e.g., a first ride, a second ride, restaurants), and analyzing traffic and movement patterns. The remote server 106 may also be operable to send information back to the tracker 102. In some embodiments, the remote server may be operable to send a request to the tracker 102 to play a sound on the speaker 158, to activate the haptic device 156, and place specific information on the display 140 (e.g., promotions at a specific restaurant in close proximity to <tracker>). The remote server 106 may further be operable to aggregate information from one or more the trackers 102 over time in order to build up a catalog of information and to identify patterns, such as locations that require higher levels of staff or security.

The invention 100 may exchange information between trackers, user devices, and server via one of more networks, including wireless networks. Various safety protocols may be utilized to ensure the security of the information. As non-limiting examples:

Access to the latest positional information for a given child or parent may only be available through a secure API utilizing JSON Web Token (JWT) tokens that each have a predefined expiration time.

Information transmitted over the secure API may be encrypted in transit via 256-bit SSL encryption.

At the end of each park day, the relational database table containing personally identifiable information may be erased.

During a lost child event, only the parent may mark a child as "found".

Identifying information may be encrypted at rest. This may include Parent Name, Parent Phone Number, Parent Email, and Child Name.

The data relationship between the user device 104 and the remote server 106 may be similar to that between the tracker 102 and the user device 104 or the remote server 106. The user device 104 and the remote server 106 may exchange location information, both regarding the location of the user device 104 and any one or more trackers 102 which are registered with the user device 104. The remote server 106 may be operable to send information to the user device 104 based on the location of the user device 104 such as, but not limited to, promotions, alerts, and requests for information. The user device 104 may also be operable to send requests to the remote server 106, such as the assistance of security in locating a lost item or child. In some embodiments, data may be sent between two or more the user devices 104. By way of example and not of limitation, the user device 104 may be operable to access information about the location of the tracker 102, such as status or location, from the remote server via a NoSQL database. In some embodiments, there may be less than about one minute of lag from a location update sent by the tracker 102 to being able to determine the location of the tracker 102 on the user device 104. In some embodiments, there is less than about 30 seconds of lag from a location update sent by the tracker 102 to being able to determine the location of the tracker 102 on the user device 104. In yet other embodiments, there may be less than about 5 minutes of lag from a location update sent by the tracker 102 to being able to determine the location of the tracker 102 on the user device 104.

In some embodiments, the user device 104 may be operable to request information from one or more of the charging stations 108 regarding the state of the power supply and the charge level of one or more the trackers 102. The charging station 108 may be operable to return this information to the user device 104. The same set of information may be operable to be shared between the remote server 106 and the charging station 108.

In some embodiments, when the scanner 110 receives information from the tracker 102, the scanner 110 may be operable to transmit that information, coupled with information from the scanner 110, to the remote server 106. By way of example and not of limitation, if a scanner receives payment information from the tracker 102, this payment information may be sent to the remote server 106 in order to process a payment. The remote server 106 may also be operable to send information back to the scanner 110, such as an alert that a payment has been completed and the amount.

In some embodiments, information may be transferred from the charging station 108 to the tracker 102. This information may include, but is not limited to, the current charge level of the power source 136 and that the power source 136 is completely charged.

In some embodiments, information may be transferred between the tracker 102 and the hub 166. This information may include, but is not limited to, the location of the tracker 102, the age of the wearer of the tracker 102, and rewards currency.

In some embodiments, information may be transferred between the remote server 106 and the hub 166. This information may include, but is not limited to, status updates, level of use, promotional content, and gaming content.

Figure 2A:
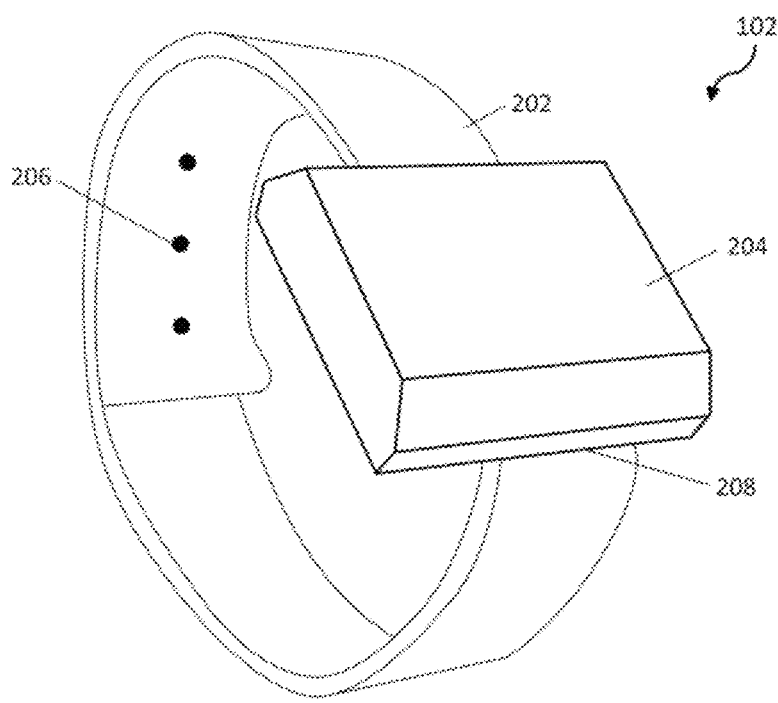
FIG. 2A is a perspective view of a tracking device consistent with certain embodiments of the present invention.

FIG. 2A illustrates a first embodiment of the tracker 102, wherein the tracker 102 includes a strap 202, a chassis 204, an attachment mechanism 206, and at least one release mechanism 208. The electronics may be housed in the chassis 204. The combination of the strap 202 and the attachment mechanism 206 may be a wristband. The chassis 204 may be shaped similar to a cuboid as shown in FIG. 2. The chassis 204 may be about 1.0 inches wide by about 1.0 inches long by about 0.5 inches tall. In some embodiments, the chassis 204 may be between about 0.5 inches and about 3.0 inches wide, between about 0.5 inches and about 3.0 inches long, and between about 0.1 inches and about 1.0 inches tall. In some embodiments, the chassis 204 may be formed in the shape of a circle or a polygon (e.g., square, rectangle, triangle, pentagon, hexagon). In some embodiments, the chassis 204 may include embellishments to either improve comfort for a user, improve ease of donning and doffing, and/or improve rate of adoption, including, but not limited to, beveled or chamfered edges, textured surfaces, or any other pattern operable to be included in the chassis 204.

In some embodiments, the strap 202 and the attachment mechanism 206 may be operable to be secured around the ankle of a wearer. In a preferred embodiment, the band may be a nylon (e.g., Nylon 6) woven band. In some alternative embodiments, the strap 202 may be a natural leather strap, a synthetic leather strap, a nylon strap, a metal strap (e.g., metal link bracelet, oyster link bracelet, president link bracelet, jubilee link bracelet, mesh bracelet (e.g., Milanese, shark mesh)), a plastic strap, a rubber strap (e.g., silicone strap, polyurethane strap), a rubber-plastic mixture, a wooden link strap, a ceramic link strap, a woven fabric strap, a combination of any of these types, or any other type of band known in the art that is capable of securing the tracker 102. In some embodiments, the metal strap may be formed of titanium and/or stainless steel. In some embodiments, the strap 202 may be formed of rubber and may include small vents down the sides of the strap to increase breathability.

The attachment mechanism 206 may preferably be at least one pin, at least one buckle (e.g., at least one pin buckle), at least one clasp, at least one snap, at least one magnet, at least one ring, hook and loop tape, at least one rivet, at least one hole, at least one button, at least one screw, at least one bolt, at least one nut, and/or at least adhesive, or any other means of connecting the tracker 102 to a person or object. In a preferred embodiment, the at least one snap may be a permanent snap. Advantageously, this may prevent the wearer (e.g., child, special needs individual) from easily removing the tracker.

As previously described, the tracker 102 may include the chassis 204 which may be operable to contain and protect the electronics. In some embodiments, the chassis 204 may be made of a durable plastic which is rigid to protect the electronics, but also soft enough to withstand normal wear and tear on the device. In some embodiments, the chassis 204 may be produced from a high durometer elastomer compound, such as, but not limited to, polyesters, polyurethanes, polyisoprene, polybutadiene, polychloroprene, butyl rubber, styrene-butadiene rubber, ethylene propylene rubber, silicone rubber, other thermoset elastomers, and any other material operable to provide a rigid enclosure for the electronics. In a preferred embodiment, the chassis 204 may be made from thermoplastic polyurethane.

Figure 2B:
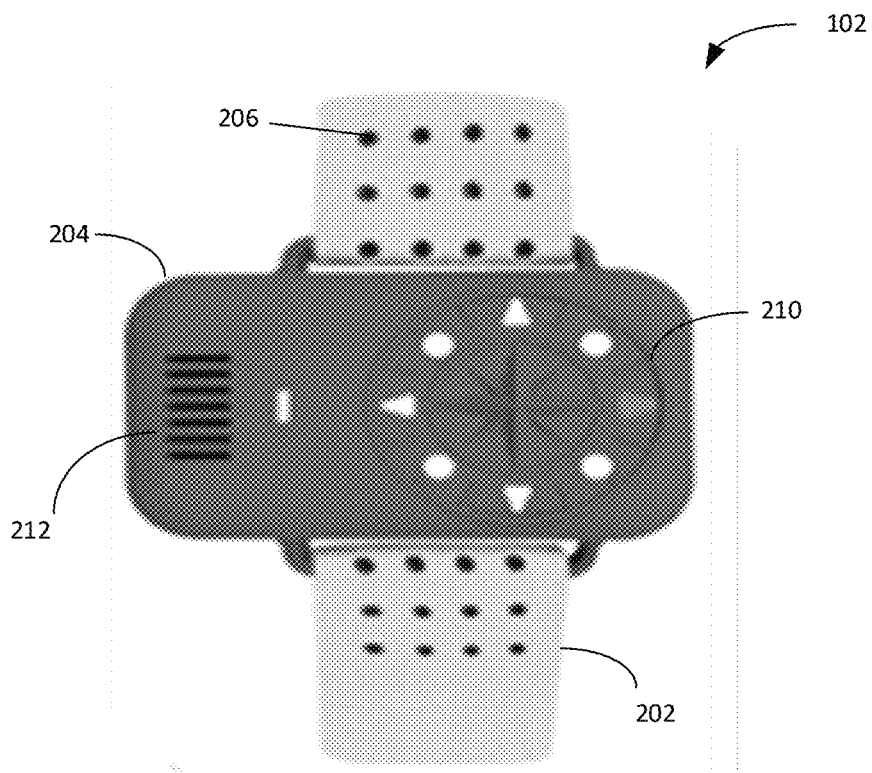
FIG. 2B is an exterior function view of a tracking device consistent with certain embodiments of the present invention.

FIG. 2B illustrates a second embodiment of the tracker 102, wherein the tracker 102 includes a strap 202, a chassis 204, an attachment mechanism 206, a compass face 210, and a speaker portion 212. The strap 202, chassis 204, and attachment mechanism 206 may be utilized as previously described. The compass face 210 and a speaker 212 may be used to direct users when the wearer is involved in a compass-driven scavenger hunt game. The tracker 102 provided to the user is configured with a compass 210 that provides unique visual alerts and the speaker 212 may provide unique auditory alerts that are separate from or synchronized with the unique visual alerts provided by the compass 210. During their day at the venue, the child may be drawn from point to point using the compass 210 and/or auditory cues delivered by the speaker 212. Whether one or multiple children (per group/family) are on the adventure, all trackers 102 may point to the same location. Upon reaching the waypoint (an important place in the venue), the tracker 102 may provide positive reinforcement to all members of the exploration party (group/family) and may then prompt the children to turn to their parents for specific entertaining, educational, or engaging content.

In FIG. 3A, an attachment mechanism 406 and a band 404 are in the form of a necklace with a clasp such that a tracker 402A may be secured around the neck of a wearer. Alternatively, there is not a band 404 and the attachment mechanism is an adhesive substrate 408 which secures the tracker 402B to the skin of a wearer, to a garment worn by a wearer, or to an item carried by a wearer as shown in FIG. 3B. Alternatively, there is not a band 404 and the attachment mechanism is a pin 412 which is attached to a backing 410 which secures the tracker 402C to a garment worn by a wearer or an item carried by a wearer as shown in FIG. 3C. In some embodiments, the at least one side of the backing 410 is decorative. In yet another embodiment, there is not a band 404 and the attachment mechanism is a buckle 414 attached to a belt 416 which secures the tracker 402D to a belt worn by a wearer as shown in FIG. 3D. In an alternative embodiment, there is not a band 404 and the attachment mechanism is a pod 418 which secures the tracker 402E to laces 420 of a shoe worn by a wearer as shown in FIG. 3E. Alternatively, the tracker 402E may attach to a strap (e.g., buckle strap, hook-and-loop tape strap) of a shoe worn by a wearer.

FIG. 4A further illustrates a front orthogonal view of a chassis 500, FIG. 4B illustrates a side orthogonal view of the chassis 500, and FIG. 4C illustrates a top orthogonal view of the chassis 500. The bottom side of the chassis, by way of a chassis base 502, may be contoured in order to provide comfort on the wrist of a wearer as shown in FIG. 4A, FIG. 4B, and FIG. 4C. In some embodiments, the chassis 500 may be about 1.0 inches wide by about 1.5 inches long by about 0.5 inches tall. In alternative embodiments, the chassis 500 may be between about 0.5 inches and about 3.0 inches wide, between about 0.5 inches and about 5.0 inches long, and between about 0.1 inches and about 2.0 inches tall.

Figure 4E:
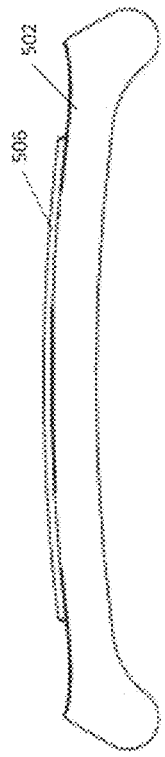
FIG. 4E is a side orthogonal view of a tracking device consistent with certain embodiments of the present invention.
Figure 4D:
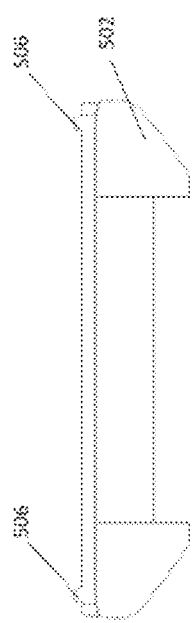
FIG. 4D is a front orthogonal view of a tracking device consistent with certain embodiments of the present invention.
Figure 4F:
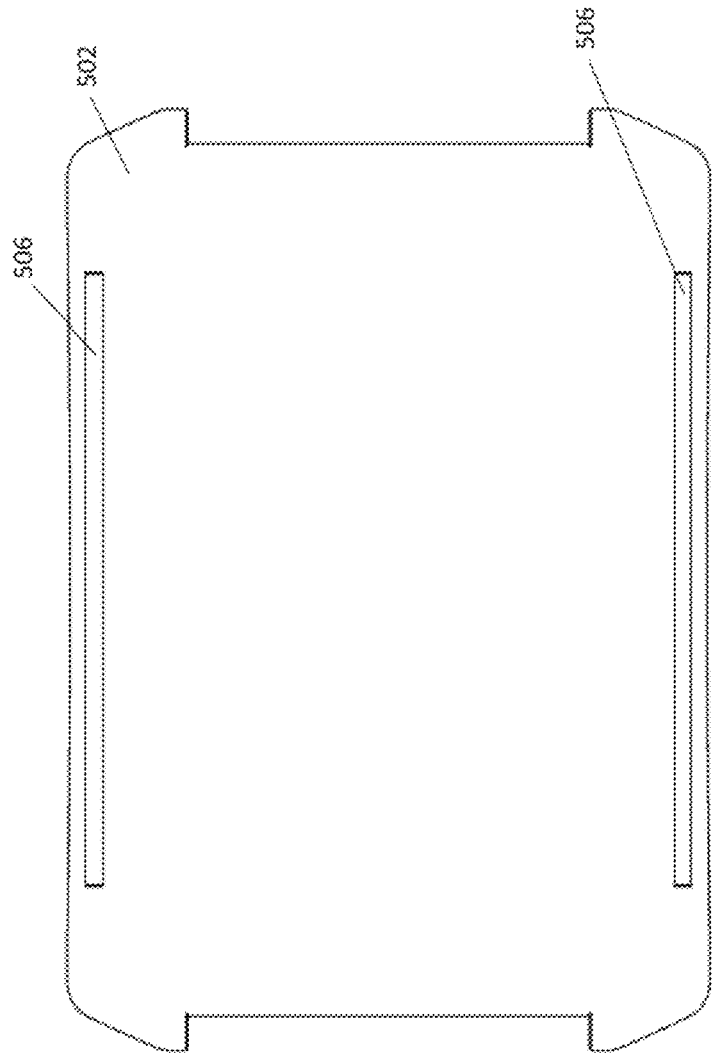
FIG. 4F is a top orthogonal view of a tracking device consistent with certain embodiments of the present invention.

FIG. 4D, FIG. 4E, and FIG. 4F illustrate front, side, and top orthogonal views, respectively, of the chassis base 502. Present on the long sides of the chassis base 502 may be guide rails 506 which align and secure the electronics including the printed circuit substrate to the chassis base 502.

Figure 4H:
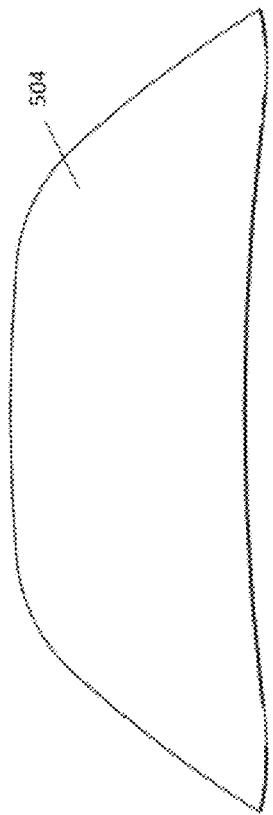
FIG. 4H is a side orthogonal view of a tracking device consistent with certain embodiments of the present invention.
Figure 4G:
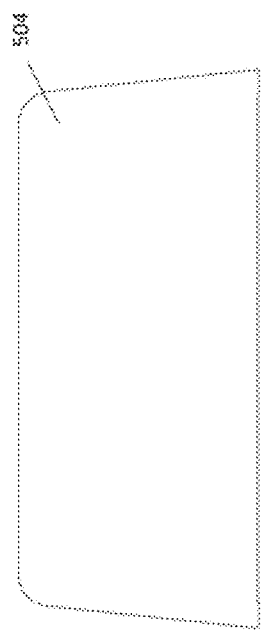
FIG. 4G is a front orthogonal view of a tracking device consistent with certain embodiments of the present invention.
Figure 4I:
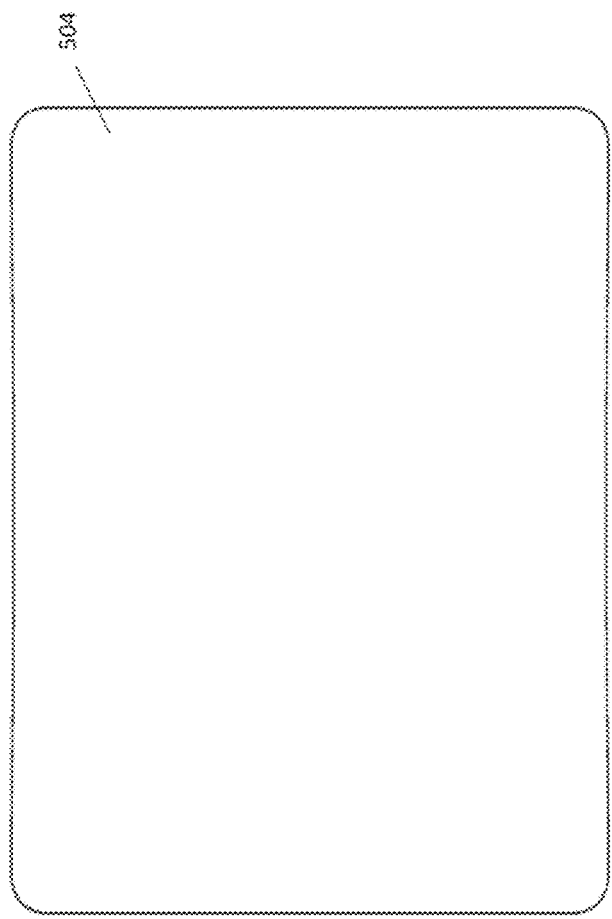
FIG. 4I is a top orthogonal view of a tracking device consistent with certain embodiments of the present invention.

FIG. 4G, FIG. 4H, and FIG. 4I illustrate front, side, and top orthogonal views, respectively, of a chassis lid 504. The shape of the chassis lid 504 may be hollow (e.g., concave) such that it may be operable to accommodate all of the electronics of the tracker. The chassis lid 504 may be sufficiently sized to house the electronics without being cumbersome to a wearer.

In some embodiments, a barcode (e.g., Quick Response (QR) code) may be printed on the back of the chassis. In other embodiments, the barcode may be engraved and printed on the back of the chassis. In yet other embodiments, the barcode may be attached to the back of the chassis using an adhesive (e.g., sticker). In alternative embodiments, an RFID tag may be mounted in the chassis. In other embodiments, a unique numeric or alphanumeric code may be printed on the back of the chassis. In yet other embodiments, a unique numeric or alphanumeric code may be molded on the back of the chassis. The barcode, tag, or code may be covered by a layer of plastic. In some embodiments, the barcode, tag, or code may be covered by a plastic coating. In other embodiments, a layer of plastic may be mechanically, chemically, or physically fixed to the back of the chassis. The barcode, tag, or code may be specific to each tracker and may not be operable to be changed. The barcode, tag, or code may provide a means for the user device to be connected to specific trackers and for operators, such as an amusement park, to keep track of the inventory of trackers.

Figure 5B:
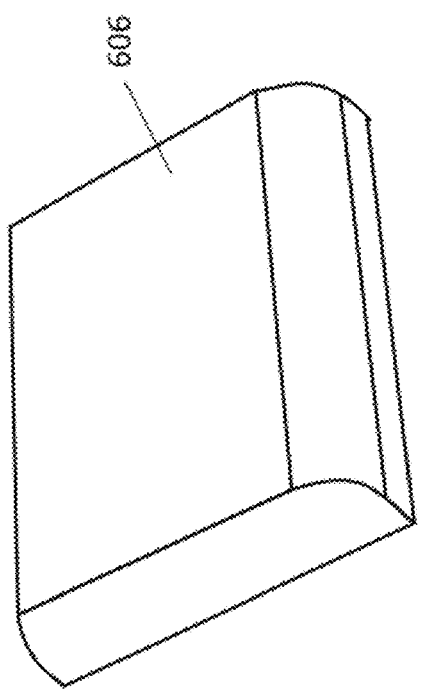
FIG. 5B is a top perspective view of a tracking device consistent with certain embodiments of the present invention.
Figure 5A:
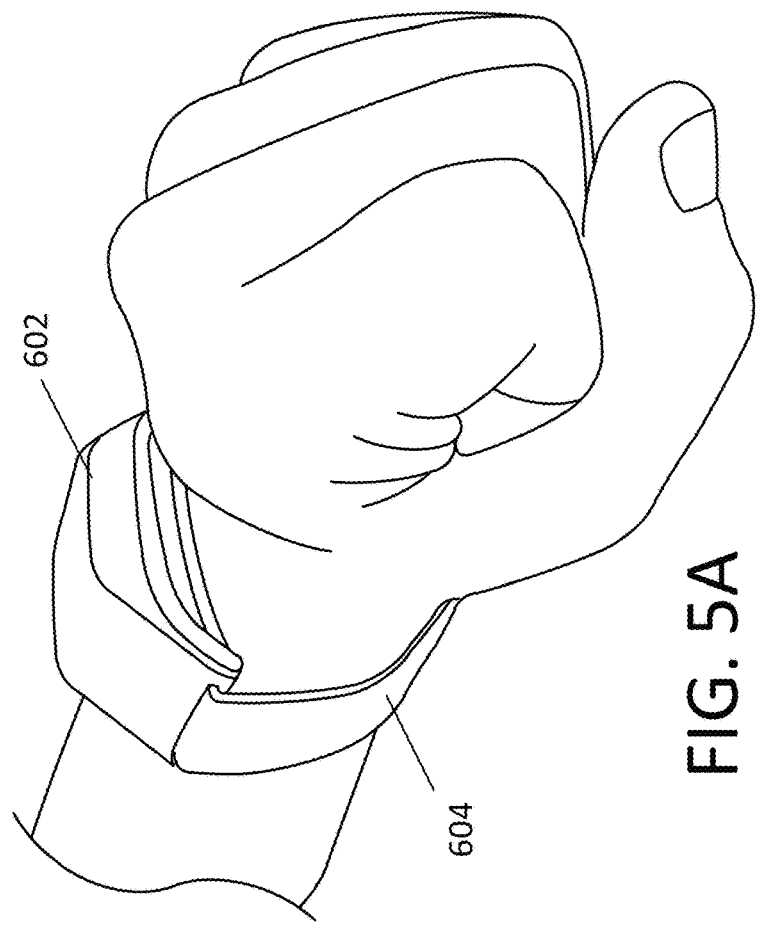
FIG. 5A is an in-use view of a tracking device consistent with certain embodiments of the present invention.

FIG. 5A illustrates an alternative embodiment of a chassis 602 connected to a complete loop strap 604. The complete loop strap 604 may extend under the chassis 602 as shown in FIG. 5A. In some embodiments, the complete loop strap 604 may be elastic and may be operable to be worn by users of many sizes. In alternative embodiments, the complete loop strap 604 may be produced in multiple sizes which are operable to be switched out in order to fit the wearer. In some embodiments, the complete loop strap 604 may be secured under the chassis 602 by pins perpendicular to the complete loop strap 604 which terminate within the chassis 602. Under a force, the pins may be operable to break away from the chassis 602 such that the chassis 602 is removed from the complete loop strap 604.

In an alternative embodiment, the strap may not be a complete loop, and may include two ends which are operable to be joined around the wrist of the wearer. Under sufficient force, the two ends of strap may be operable to disconnect such that the strap and therefore the chassis fall off of the wearer to prevent possible injury or the breaking of the chassis.

FIG. 5B illustrates an alternative embodiment of a chassis 606.

Figure 6A:
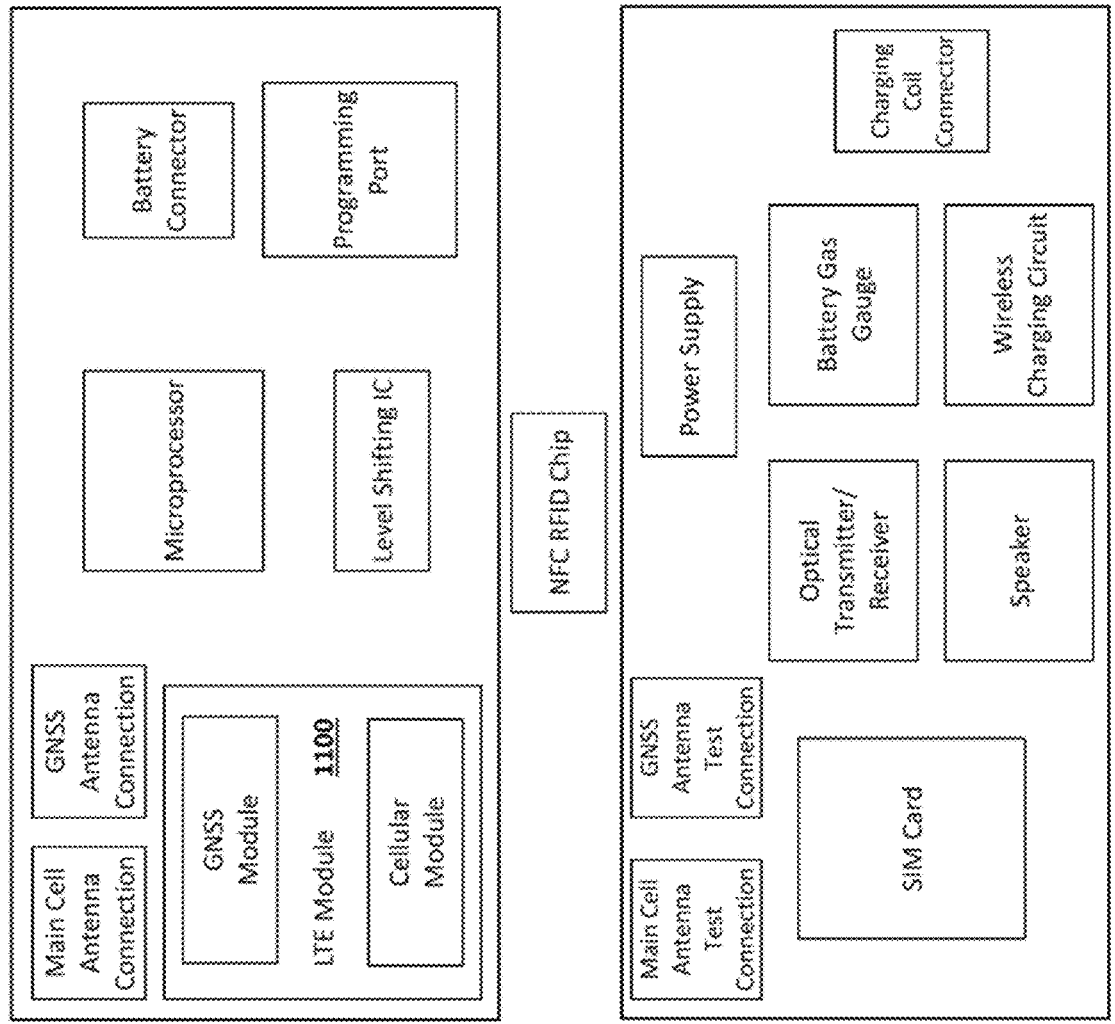
FIG. 6A is a block diagram of a printed circuit board consistent with certain embodiments of the present invention.

FIG. 6A illustrates a block diagram of the printed circuit board 126 containing the electronics of a tracker, according to one embodiment of the present invention. In some embodiments, one or more of the electronic components mounted on the printed circuit board 126 may be contained on a single chip. In some embodiments, a chip 1100 may be an ultra-compact, long-term evolution (LTE) module (e.g., QUECTEL BG77 ultra-compact LTE Cat M1/Cat NB2 Module, QUECTEL BG96 LTE Cat M1/Cat NB2/EGPRS Module). Selection criteria for the chip 1100 to be used in the tracker may include, but are not limited to, size, power consumption, system memory, security features, mounting potential, wireless connection capabilities and frequency bands, global navigation satellite system (GNSS) functionality, wireless carrier certification, electrical interfaces (e.g., USB), output power, operation temperature range, upload and download speeds, and combinations of the above. In other embodiments, the electronics may not include a multifunctional chip, instead utilizing multiple other components to fulfil the requirements of the tracker.

In some embodiments, the electronic components present on the printed circuit board 126 may include, but are not limited to, a main cell antenna connection, a main cell antenna test connection, a GNSS antenna connection, a GNSS antenna test connection, the chip 1100, a microprocessor, a level shifter, a battery connector, a programming port, an NFC RFID chip, a SIM card, an optical transmitter/receiver, a speaker, a battery gas gauge, a power supply, a wireless charging circuit, and a charging coil connector.

Figure 6B:
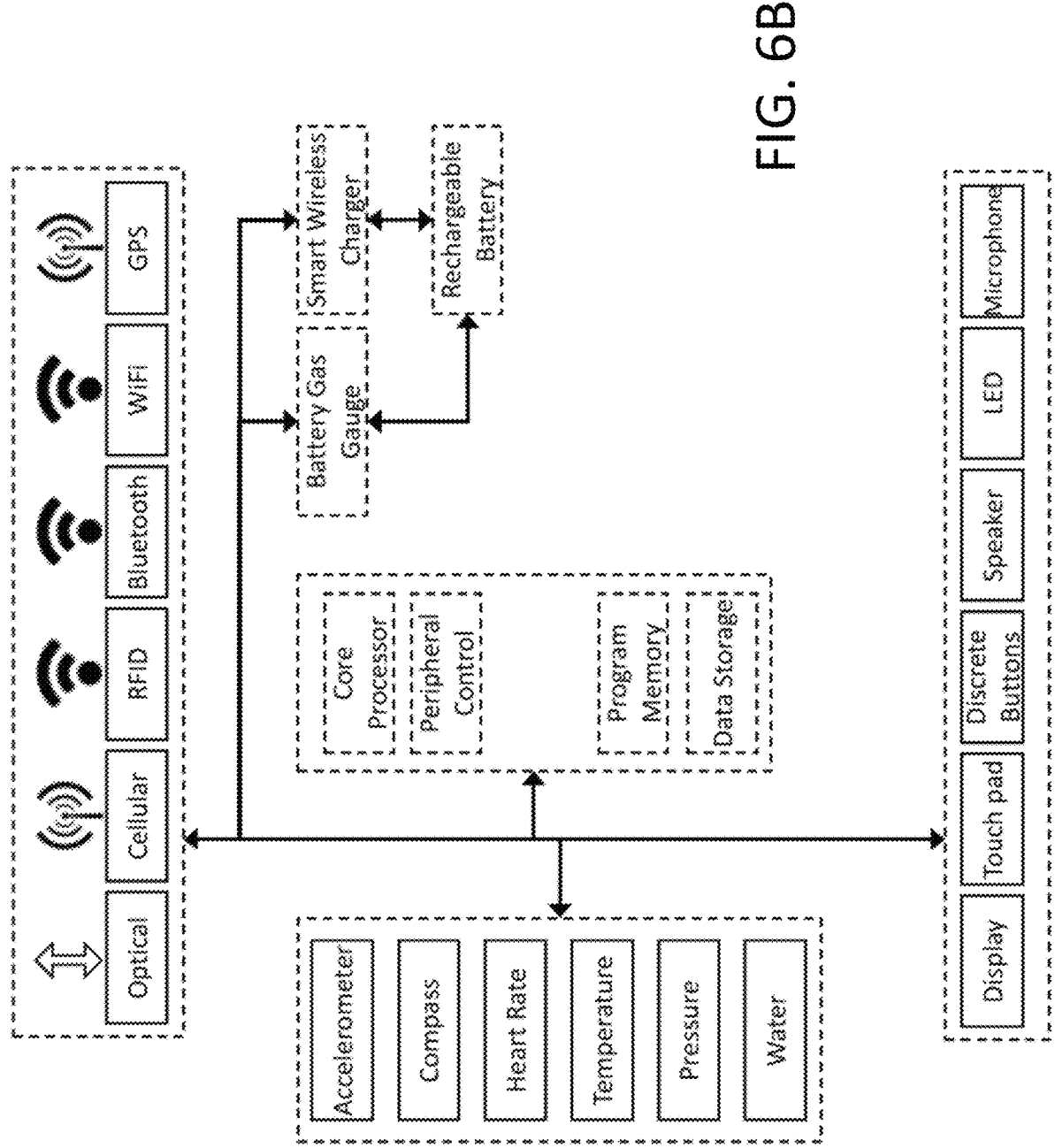
FIG. 6B is a block diagram of tracker hardware consistent with certain embodiments of the present invention.

FIG. 6B illustrates a block diagram of the hardware within a tracker, which includes, but is not limited to, an accelerometer, a compass, a heart rate sensor, a temperature sensor, a pressure sensor, a water contact sensor, a core processor, a peripheral control unit, a program memory unit, data storage, a battery gas gauge, a wireless charger or smart wireless charger, a rechargeable battery, a display, a touch pad, one or more discrete buttons, a speaker, one or more LEDs, a microphone, and communication modules including, but not limited to, optical communication, cellular communication, RFID, BLUETOOTH, WI-FI, and GPS.

Figure 7:
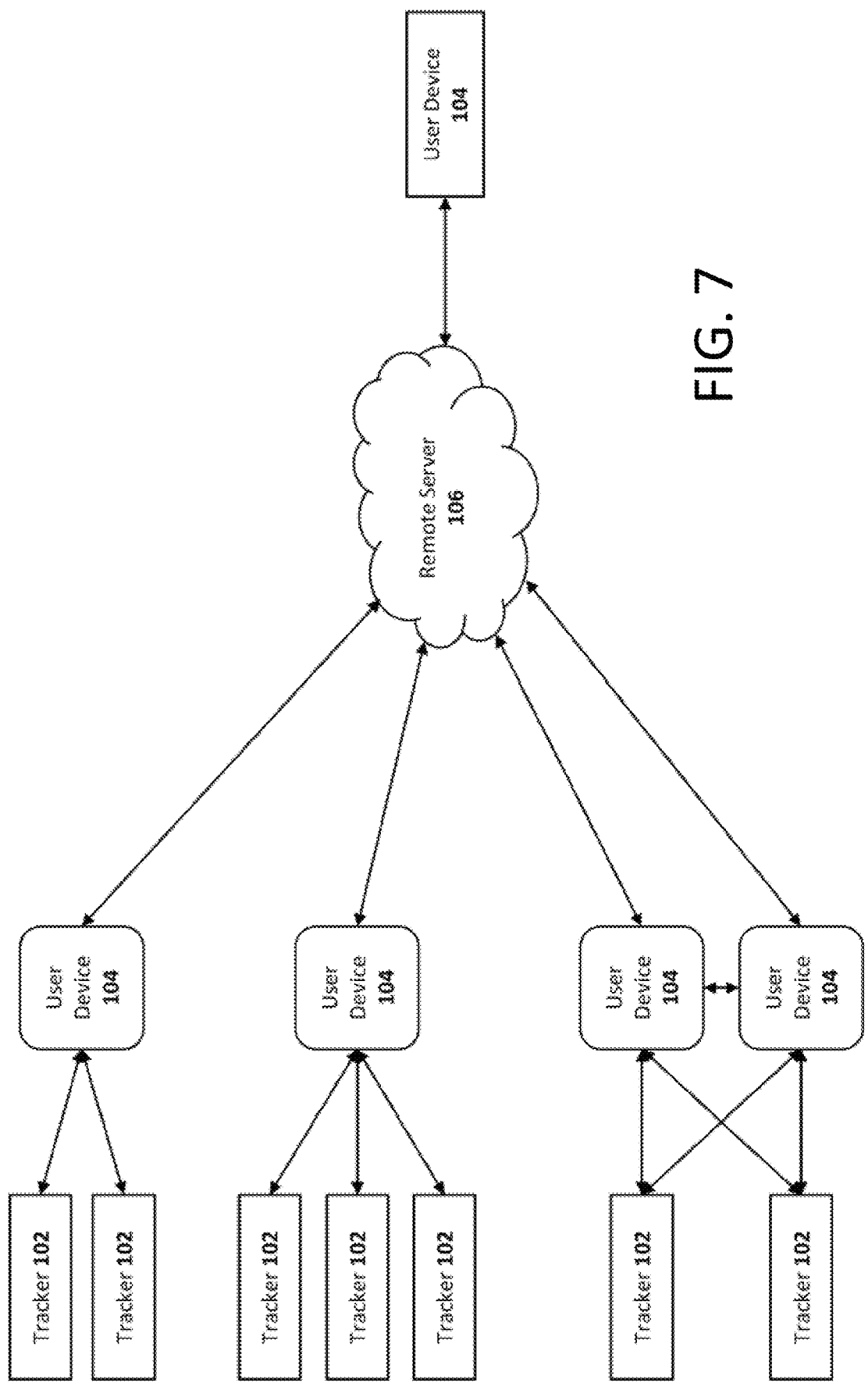
FIG. 7 is an illustration of a tracking network consistent with certain embodiments of the present invention.

FIG. 7 is an illustration of a network of devices in a real-time location and alert system which demonstrates one path of communication between devices. One or more the trackers 102 are connected to the user device 104. By way of example and not of limitation, one parent or guardian may be responsible for monitoring the location of one or more child, or one individual may be responsible for tracking another individual and the location of a backpack. In some embodiments, multiple parents or guardians may be responsible for tracking multiple children or objects, so each of the trackers 102 may be connected to more than one of the user devices 104, and the user devices 104 are operable to communicate with one another. The user devices 104 in the system may then be operable to communicate with the remote server 106 in order to place relevant requests and receive information. Although one remote server is shown, it is equally possible to have any number of remote servers greater than one. A user may be able to opt into sending their data to the remote server 106, which may be stored in at least one database on the remote server 106. The remote server 106 may be further operable to send information to a user device 104 not connected to a tracker, such as a device (e.g., smartphone, tablet, laptop, desktop) used to monitor the system overall. One example of a user device 104 not connected to a tracker is a device used by amusement park personnel to analyze the flow of attendees in the park that may operate on information collected from any number of trackers and transmitted from the remote server.

Figure 8:
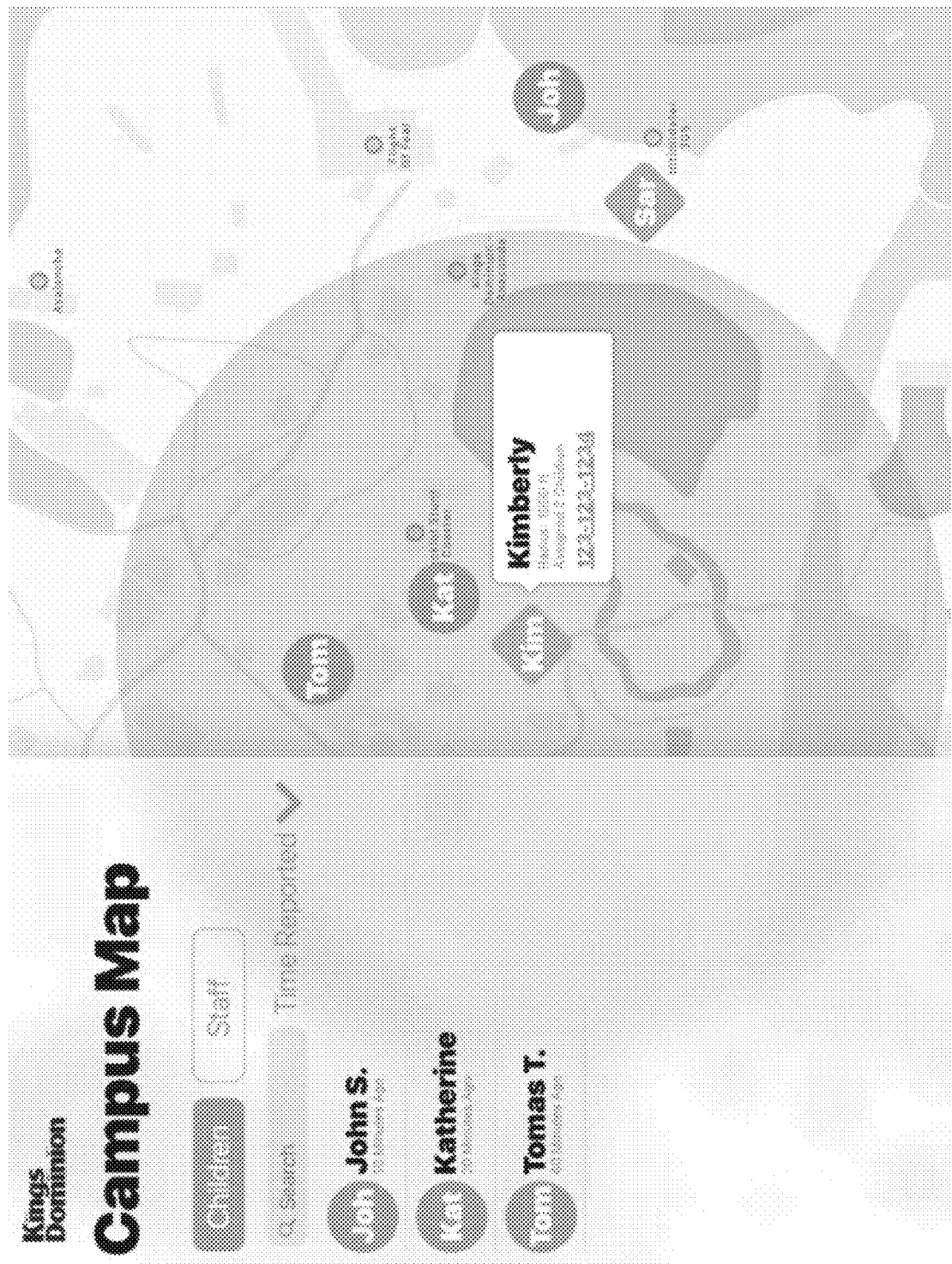
FIG. 8 illustrates a park staff GUI that shows map of the park and the location of children in the park based upon their track location consistent with certain embodiments of the present invention.

FIG. 8 illustrates a non-limiting example of a park staff GUI that shows a map of a park and the location of children in the park based on their tracker location, as well as the location of park staff.

Figure 9:
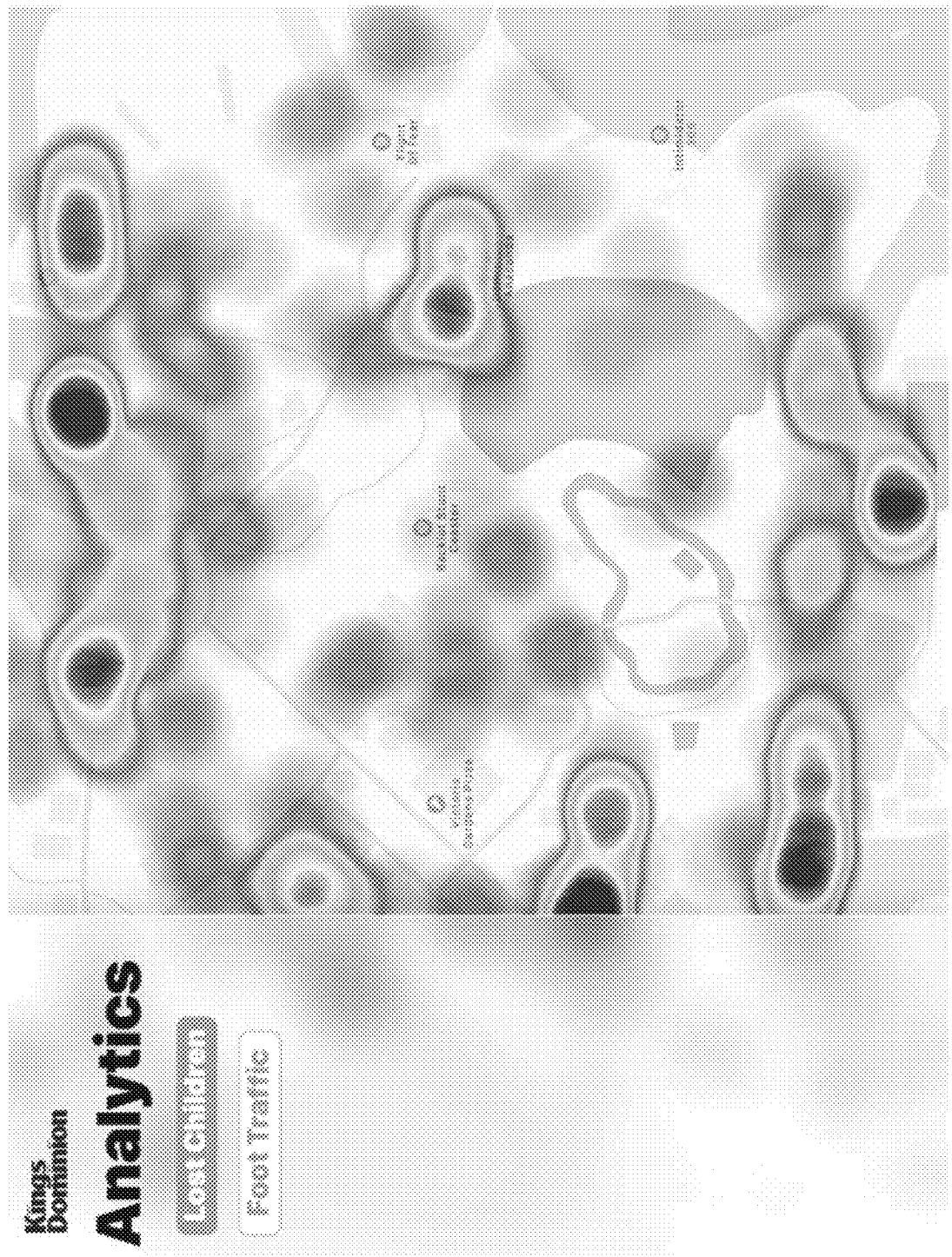
FIG. 9 illustrates a park staff GUI that shows a heat map of lost children and/or overall foot traffic in the park consistent with certain embodiments of the present invention.

FIG. 9 illustrates a park staff GUI that shows a heat map of lost children and of park foot traffic. Other tracking data operable to be gathered and analyzed on the remote server may include, but is not limited to, wait times or lines, number of people in lines or queues, park population density and population density trends, park traffic patterns, attendee behavior, vending sales and use, vending location optimization, merchandise sales and use, merchandise location optimization, vending and merchandise item layout optimization, banner promotion optimization, targeted advertising response and optimization, return rates per attraction, promotion response rates, promotion optimization, and any other variable which is operable to be used to improve return on investment for the park or venue.

Figure 10:
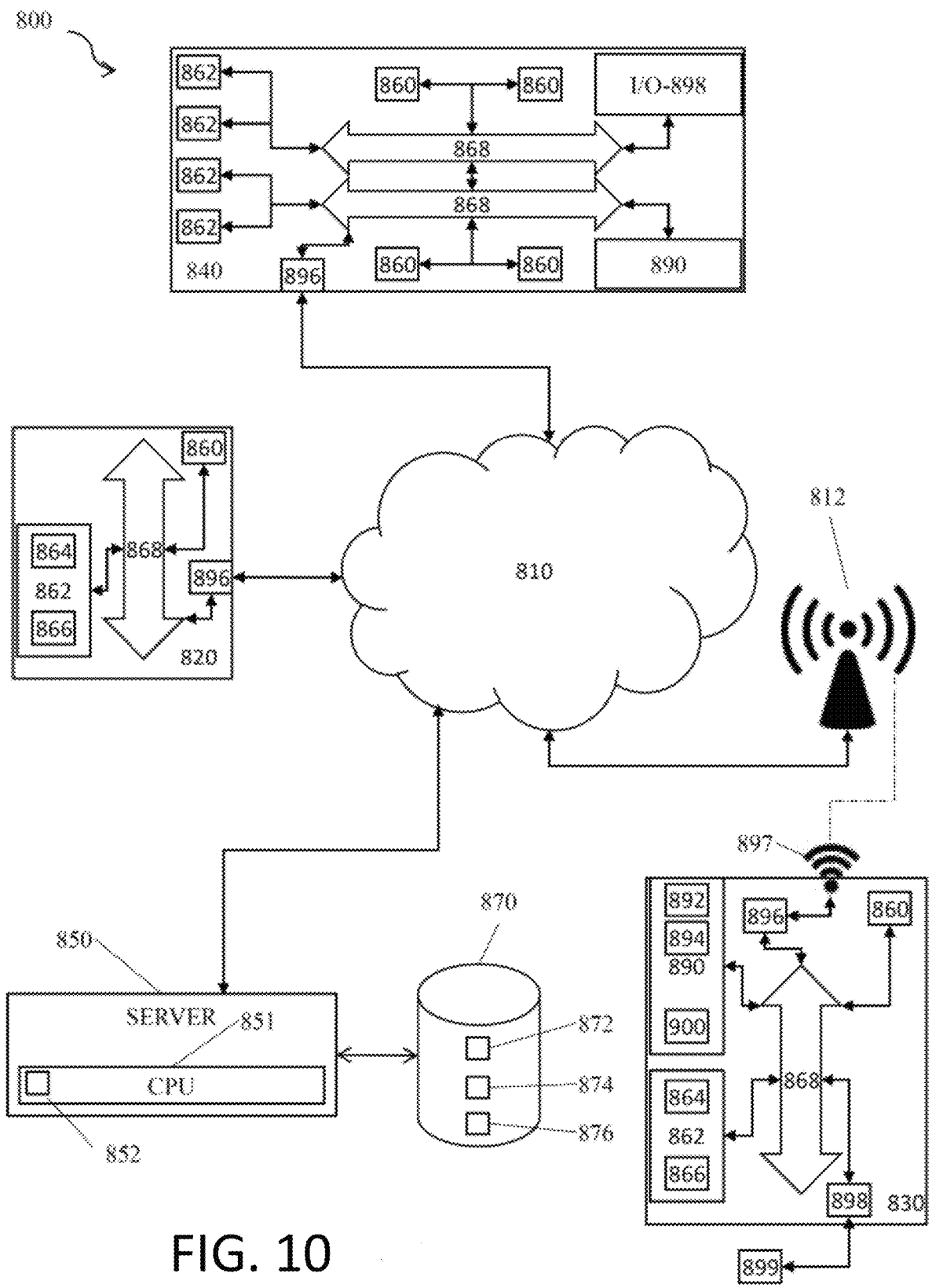
FIG. 10 is a schematic diagram of a system consistent with certain embodiments of the present invention.

FIG. 10 is a schematic diagram of an embodiment of the invention illustrating a system 800 having a network 810, a plurality of computing devices, a server 850, and a database 870. The plurality of computing devices are represented by a first computing device 820, a second computing device 830, and a third computing device 840.

The server 850 may be constructed, configured, and coupled to enable communication over the network 810 with the first computing device 820, the second computing device 830, and the third computing device 840. The server 850 may include a processing unit 851 with an operating system 852. The operating system 852 may enable the server 850 to communicate through the network 810 with the remote, distributed user devices. The database 870 may be operable to house an operating system 872, memory 874, and programs 876.

In some embodiments of the invention, the system 800 may include the network 810 for distributed communication via a network antenna 812 and processing by at least one mobile communication computing device represented here by the second computing device 830. Alternatively, wireless and wired communication and connectivity between devices and components described herein may include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 may be a virtualized computing system capable of executing any or all aspects of software and/or application components presented herein on the first computing device 820, the second computing device 830, and the third computing device 840. In certain aspects, the system 800 may be operable to be implemented using hardware or a combination of software and hardware, either in a dedicated computing device, or integrated into another entity, or distributed across multiple entities or computing devices.

By way of example, and not limitation, the first computing device 820, the second computing device 830, and the third computing device 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In some embodiments, an individual computing device selected from the plurality of computing devices may include components such as a processor 860, a memory 862 having a random access memory (RAM) 864 and a read only memory (ROM) 866, and a bus 868 that couples the memory 862 to the processor 860. In another embodiment, the individual computing device may be operable to additionally include components such as storage media 890 for storing an operating system 892 and one or more application programs 894, a network interface unit 896, and/or an input/output controller 898. Each of the components may be operable to be coupled to each other through at least one bus. The input/output controller 898 may be operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be operable to be a general purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that are able to perform calculations, process instructions for execution, and/or other manipulations of information.

In another implementation, shown as the third computing device 840 in FIG. 10, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the system 800 may be operable to operate in a networked environment using logical connections to local and/or remote computing devices through the network 810. The individual computing devices may be operable to connect to the network 810 through the network interface unit 896 connected to the bus 868. The individual computing devices may be operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 may be operable to provide for communications under various modes or protocols.

In one or more exemplary aspects, the instructions may be operable to be implemented in hardware, software, firmware, or any combinations thereof. A computer readable medium may be operable to provide volatile or non-volatile storage for one or more sets of instructions, such as operating systems, data structures, program modules, applications, or other data embodying any one or more of the methodologies or functions described herein. The computer readable medium may be operable to include the memory 862, the processor 860, and/or the storage media 890 and may be operable be a single medium or multiple media (e.g., a centralized or distributed computer system) that store the one or more sets of instructions 900. Non-transitory computer readable media may include all computer readable media, with the sole exception being a transitory, propagating signal per se. The instructions 900 may be further operable to be transmitted or received over the network 810 via the network interface unit 896 as communication media, which may be operable to include a modulated data signal such as a carrier wave or other transport mechanism and includes any delivery media. The term "modulated data signal" may mean a signal that has one or more of its characteristics changed or set in a manner as to encode information in the signal.

The storage medias 890 and the memory 862 may include, but are not limited to, volatile and nonvolatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that are able to be used to store the computer readable instructions and which are able to be accessed by the system 800.

In some embodiments, the system 800 may be within a cloud-based network. In some embodiments, the server 850 may be a designated physical server for the first computing device 820, the second computing device 830, and the third computing device 840. In some embodiments, the server 850 is a cloud-based server platform. In some embodiments, the cloud-based server platform hosts serverless functions for the first computing device 820, the second computing device 830, and the third computing device 840.

In another embodiment, the system 800 may be within an edge computing network. The server 850 may be an edge server and the database 870 may be an edge database. The edge server and the edge database may be part of an edge computing platform. In some embodiments, the edge server and the edge database may be designated to the first computing device 820, the second computing device 830, and the third computing device 840. In some embodiments, the edge server and the edge database may not be designated for the first computing device 820, the second computing device 830, and the third computing device 840. The first computing device 820, the second computing device 830, and the third computing device 840 may connect to an edge server in the edge computing network based on proximity, availability, latency, bandwidth, and/or other factors.

It is also contemplated that the system 800 may be operable to not include all of the components shown in FIG. 10, may be operable to include other components that are not explicitly shown in FIG. 10, or may be operable to utilize an architecture completely different than that shown in FIG. 10 while continuing to accomplish the functions of the innovative system. The various illustrative logical blocks, modules, elements, circuits, and algorithms described in connection with the embodiments disclosed herein may be operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Figure 11:
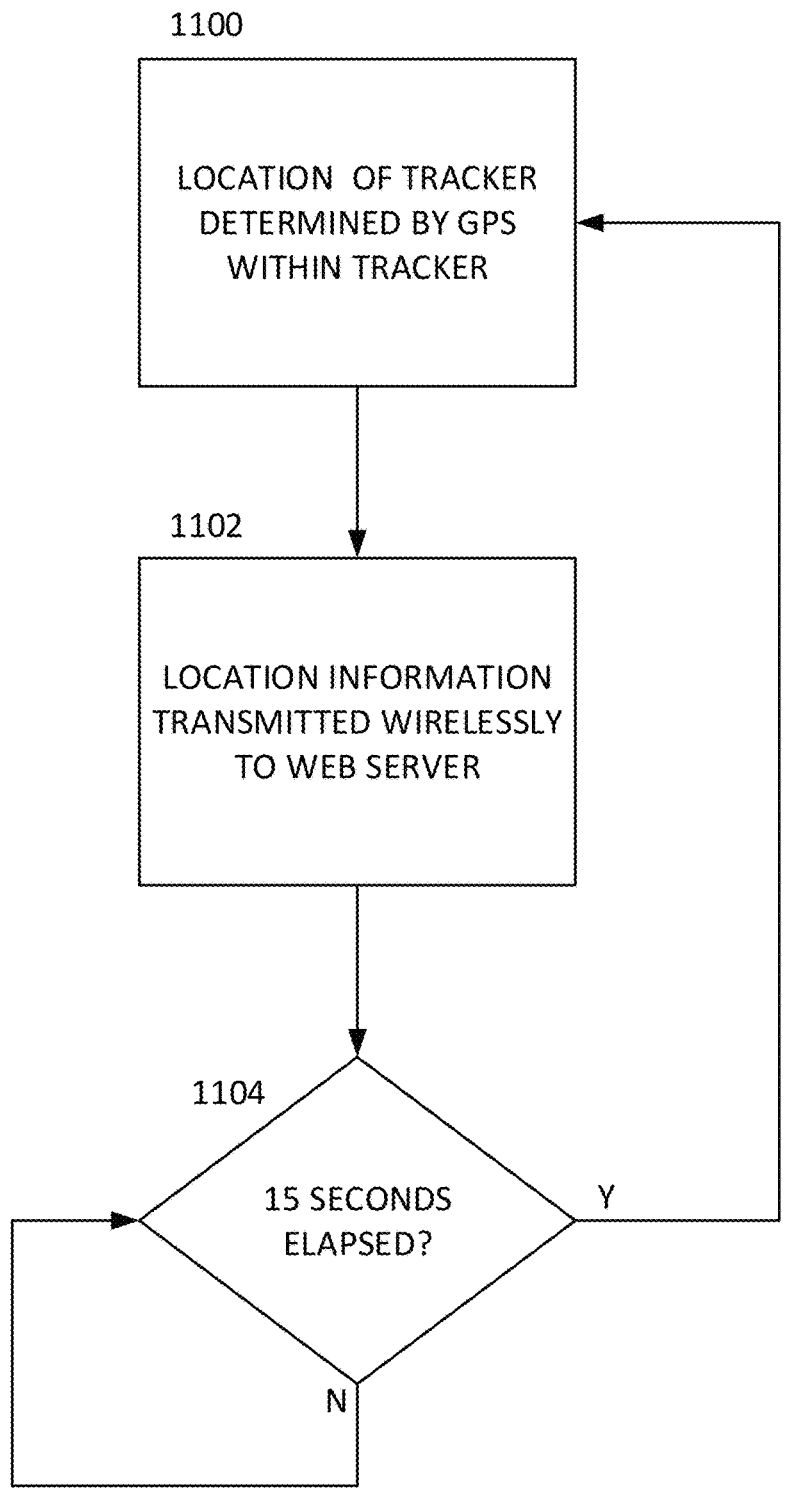
FIG. 11 is a flow diagram of location tracking from the perspective of a tracking device consistent with certain embodiments of the present invention.

FIG. 11 is a flow diagram of location tracking from the perspective of the tracker according to at least one embodiment of the invention 100. At block 1100, the child's location may be determined by the onboard GPS chipset in the tracker. In some embodiments the location may be determined to within six digits of accuracy. At block 1102, the tracker may transmit the location information wirelessly to a web server. Block 1104 illustrates that in some embodiments the tracker may send an update of the location information after a 15 second interval has elapsed.

Figure 12A:
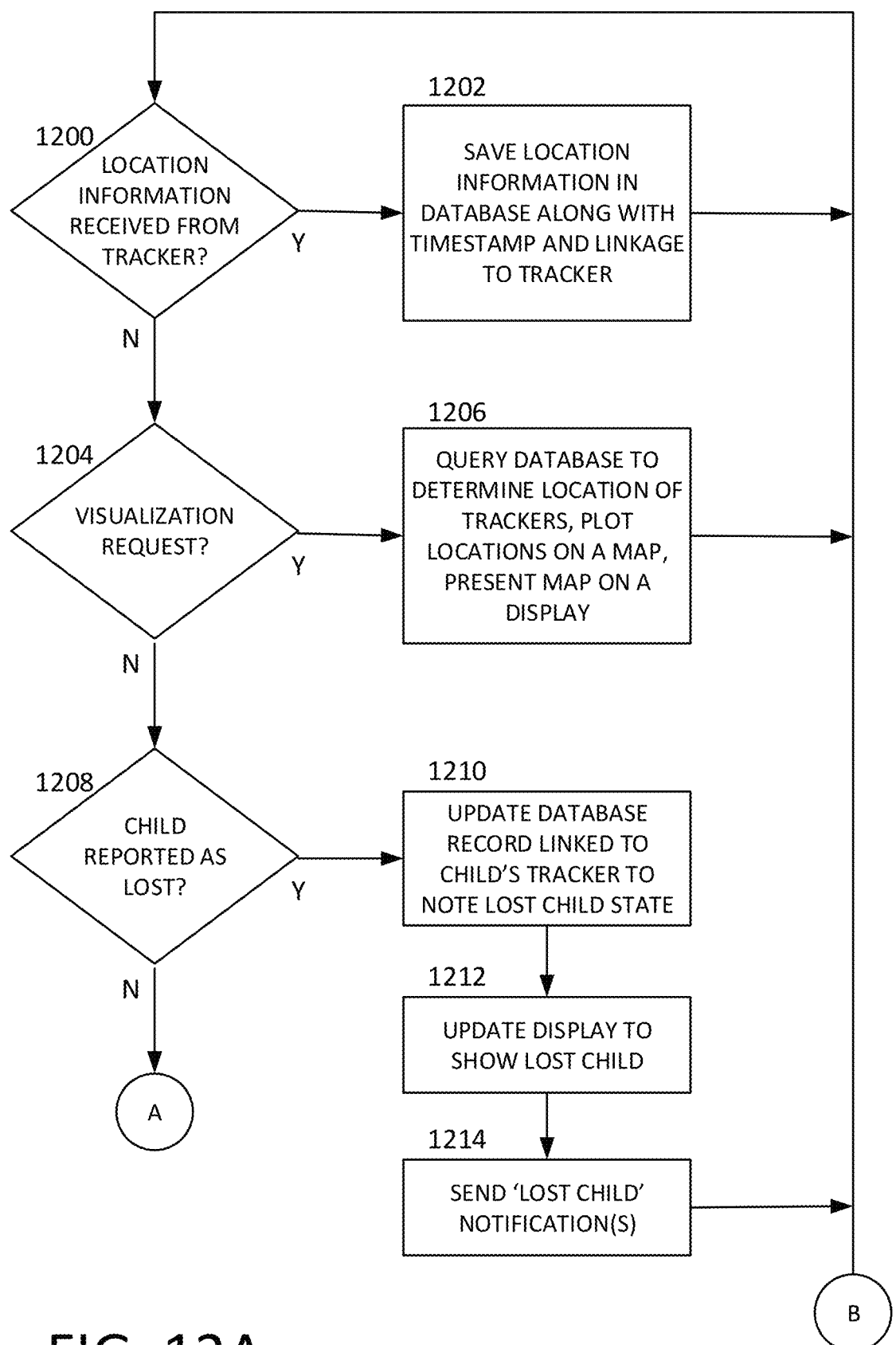
FIG. 12A is a flow diagram of location tracking and lost child tracking from the perspective of a server consistent with certain embodiments of the present invention.
Figure 12B:
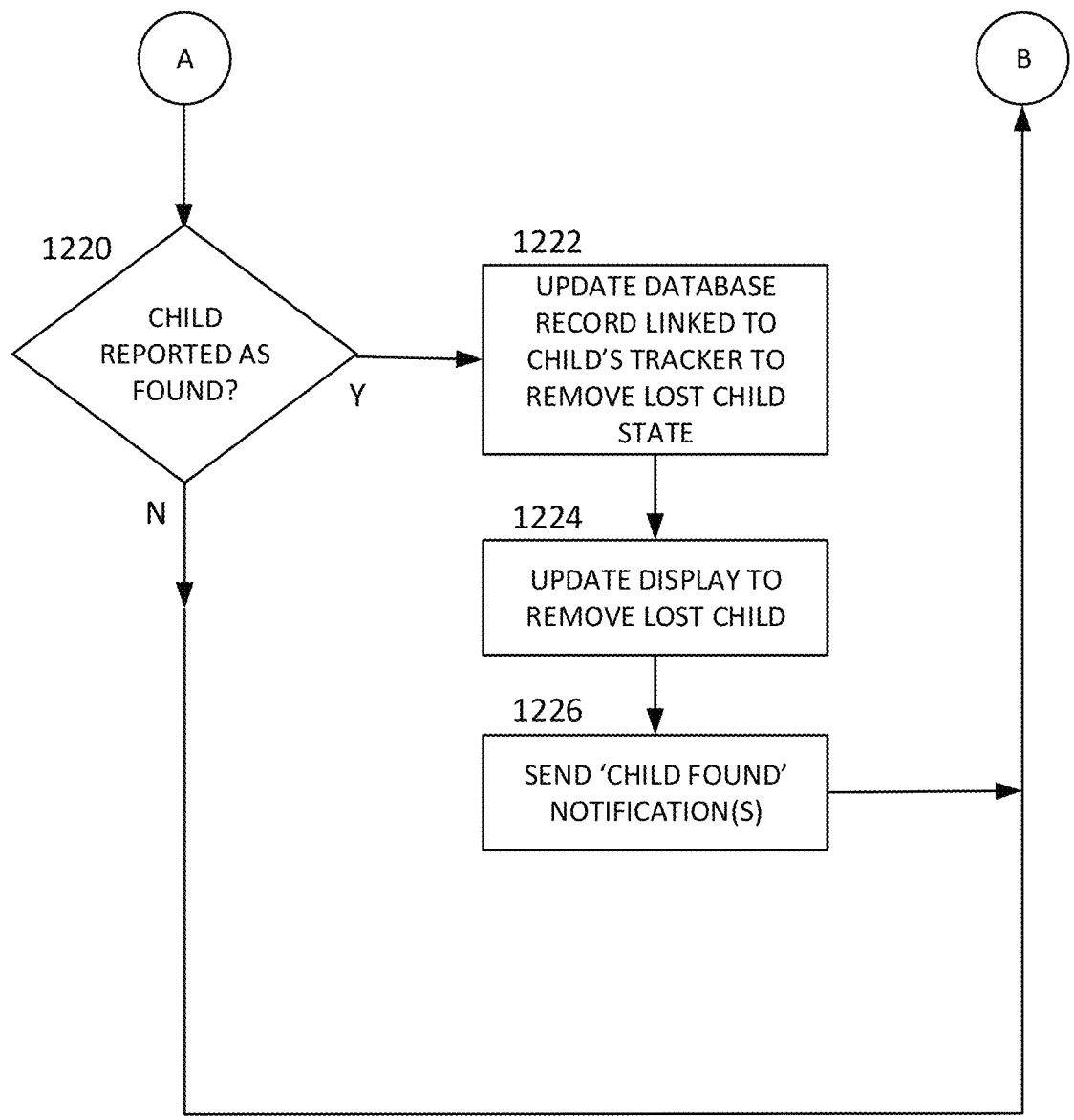
FIG. 12B is continuation of FIG. 12A which is a flow diagram of location tracking and lost child tracking from the perspective of a server consistent with certain embodiments of the present invention.

FIG. 12A and FIG. 12B show a flow diagram of location tracking and entity tracking, where, in a non-limiting example, the entity is a lost child, from the perspective of the web server according to at least one embodiment of the invention 100. At block 1200 a check is made to determine if new location information for an entity has been received from a tracker. If, in a non-limiting example, new location information has been received, then at block 1202 the location information may be recorded in a database with information links to the child ID entity information as well as the timestamp for each recorded entry. The child ID may be determined from the association that exists between a child and the tracker carried by the child. A collection of timestamped records in the database that are all linked to the same child may provide a history of the movements of that child.

At block 1204, a check is performed to determine if a request to visualize the location tracking database has been made. If so, at block 1206 the location information recorded in the database may be retrieved and plotted. The plot that results may be displayed on a GUI.

At block 1208, a check is made to determine if a child has been reported as lost. A child can be marked as lost by either their parent through the mobile app or by park personnel utilizing the staff app or dashboard. If a child has been reported as lost, at block 1210 the database is updated to change the status of the child and/or tracker. Once a child is marked as lost, the staff app and dashboard retrieve the location information of the tracker associated with the child from the database and display a list of lost children for park staff to consume as shown in block 1212.

At block 1208, the parent is notified that park staff have been notified. As a non-limiting example, the notification may be made via an SMS message and may be initiated via an external API call to a 3rd party service.

Using the child's mapped location, the parent and/or park personnel can find the missing child, return it to the parent, and then the parent marks the child as "found" using a button on the mobile application. Only parents have the ability to mark children as "found" for security purposes. At block 1220, a check is made to determine if a lost child has been reported as found. At block 1222, if a child is marked as found, the relational database may be updated to indicate that the child and parent are no longer in a separated state. At block 1224, the staff app and dashboard may be updated to remove the found child from the display showing a list of lost children for park staff. At block 1226, the parent is again notified wirelessly that their child was marked as found (to ensure it wasn't done accidentally).

FIG. 12A and FIG. 12B illustrate that the queries for change in location information and requests for status change and reporting are performed in a loop with all paths eventually returning to block 1200. As a non-limiting example, the exit from block 1202 returns to block 1200. Alternatively, the loop could be achieved if each of block 1202, block 1206, and block 1214 continued on to the decision block on the line below them.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components are able to take on. All modifications and improvements have been deleted herein for the sake of conciseness and readability but are properly within the scope of the present invention.

While certain illustrative embodiments have been described, it is evident that many alternatives, modifications, permutations and variations will become apparent to those skilled in the art in light of the foregoing description.

We claim:

1. A system comprising:
a plurality of trackers,
a plurality of user devices,
at least one remote server,
at least one charging station, and one or more networks;
where the said trackers are attached to a tracked entity;
where the said trackers communicate with the at least one remote server, the said user devices, the at least one charging station, or combinations thereof via the one or more networks;
said plurality of trackers each containing a compass element providing unique auditory and visual alerts to said tracked entity;
where the at least one tracker communicates location information within one or more geofenced areas to the at least one remote server, the at least one user device, the at least one charging station, or combinations thereof;
where the at least one remote server is operable to maintain the location information of the said plurality of trackers at all times, and take an action or alert said entity or other individual when a tracked entity enters or exits a geofenced area;
where the at least one user device is operable to display the location of the at least one tracker;
where the plurality of user devices is operable to modify the operation of the said plurality of trackers;
said remote server transmitting said action or alert comprising entertaining, educational, engaging, marketing or promotional content as any of said plurality of trackers is detected within a specific geofenced area or close to a physical target location;
where said action or alert provides directions within a geofenced area as activities or other content branded to locations within the geofenced area and provides directions and rewards associated with said branded locations.

2. The system according to claim 1 where modifying the operation of the tracker comprises activating and/or deactivating visible features of the tracker, audible features of the tracker, haptic features of the tracker, or combinations thereof.

3. The system according to claim 1 where the at least one remote server maintains, in a database, timestamped records of the location information that comprise a history of movement among one or more geofenced areas of the plurality of tracker devices.

4. The system according to claim 1 further comprising:
at least one scanner;
where the at least one scanner is operable to communicate with the plurality of tracker devices, the plurality of user devices, the at least one remote server, the at least one charging station, or combinations thereof via the one or more networks;
where the at least one scanner is operable to identify the at least one tracker that is scanned by the at least one scanner;
where the at least one scanner is operable to complete payment processing and transmit the location information of said at least one tracker.

5. The system according to claim 1 further comprising:
at least one hub;
where the at least one hub is operable to communicate with each tracker, each user device, the at least one remote server, the at least one charging station, the at least one scanner, or combinations thereof via the one or more networks;
where the at least one hub is operable to identify each tracker via the at least one scanner associated with the at least one hub;
where responsive to identifying each tracker, the at least one hub is operable to trigger one or more events on any tracker, display location specific content, or both.

6. The system according to claim 1 where responsive to receiving a report of the loss of a tracked entity, the at least one remote server communicates one or more messages providing a last known location of the lost tracker that is associated with a tracked entity that is reported as lost.

7. A method comprising:
communicating over one or more networks, from tracker to at least one remote server, location information of a tracked entity within one or more geofenced areas to which the tracker is attached on a periodic and repeated basis;
each of said trackers containing a compass element providing unique auditory and visual alerts to said tracked entity;
tracking, by the at least one remote server, the location information within said one or more geofenced areas of the tracked entity as timestamped records in a database;
maintaining the location information of each tracker at all times, and take an action or alert said entity or other individual when a tracked entity enters or exits a geofenced area;
transmitting said action or alert comprising entertaining, educational, engaging, marketing or promotional content as any of said plurality of trackers is detected within a specific geofenced area or close to a physical target location;
where said action or alert provides directions within a geofenced area as activities or other content branded to locations within the geofenced area and provides directions and rewards associated with said branded locations.

8. The method according to claim 7 further comprising:
modifying, by the at least one remote server, one or more data records in the database to record the geofenced location of the tracked entity;
communicating, the geofenced location of each tracked entity as each tracked entity comes within a pre-configured distance of a position within said geofenced location area.

9. The method according to claim 7 where a tracking location event comprises: activating visible features of the tracker, audible features of the tracker, haptic features of the tracker, or combinations thereof.

10. The method according to claim 7 further comprising:
receiving, by the at least one remote server, a report of locating the tracked entity;
providing directions and other information to each tracked entity in an informational event.

11. The method according to claim 10 further comprising:
modifying, by the at least one remote server, one or more data records in the database to record that the tracked entity is within an action location within said geofenced area;
communicating, by the at least one remote server to a plurality of the one or more user devices, the completion of actions directed to said tracked entity during positioning within said geofenced area.

12. The method according to claim 10 where further comprising:
deactivating visible features of the at least one tracker, audible features of the at least one tracker, haptic features of the at least one tracker, or combinations thereof when all directions have been completed.

\* \* \* \* \*